United States Patent
Hamza

(10) Patent No.: US 11,917,177 B2
(45) Date of Patent: Feb. 27, 2024

(54) DYNAMIC ADAPTATION OF VOLUMETRIC CONTENT COMPONENT SUB-BITSTREAMS IN STREAMING SERVICES

(71) Applicant: VID SCALE, INC., Wilmington, DE (US)

(72) Inventor: Ahmed Hamza, Montreal (CA)

(73) Assignee: VID Scale, Inc., Wilmington, DE (US)

( * ) Notice: Subject to any disclaimer, the term of this patent is extended or adjusted under 35 U.S.C. 154(b) by 148 days.

(21) Appl. No.: 17/623,999

(22) PCT Filed: Jul. 2, 2020

(86) PCT No.: PCT/US2020/040667
§ 371 (c)(1),
(2) Date: Dec. 30, 2021

(87) PCT Pub. No.: WO2021/003371
PCT Pub. Date: Jan. 7, 2021

(65) Prior Publication Data
US 2022/0353520 A1   Nov. 3, 2022

Related U.S. Application Data

(60) Provisional application No. 62/869,705, filed on Jul. 2, 2019.

(51) Int. Cl.
*H04N 19/44* (2014.01)
*H04N 19/46* (2014.01)
*H04N 19/184* (2014.01)

(52) U.S. Cl.
CPC ........... *H04N 19/44* (2014.11); *H04N 19/184* (2014.11); *H04N 19/46* (2014.11)

(58) Field of Classification Search
CPC ....... H04N 19/44; H04N 19/46; H04N 19/184
(Continued)

(56) References Cited

U.S. PATENT DOCUMENTS

2014/0086317 A1   3/2014  Wang

OTHER PUBLICATIONS

Aksuet al., "OnDASHStreamingofV-PCCData", NokiaTechnologies, ISOMECJTC1/SC29/WG11MPEG2019/m48117,Gothenburg,Sweden, Jul. 2019,3pages (Year: 2019).*

(Continued)

*Primary Examiner* — Jeffery A Williams
(74) *Attorney, Agent, or Firm* — Condo Roccia Koptiw LLP

(57) ABSTRACT

A media content processing device may decode visual volumetric content based on one or more messages, which may indicate which attribute sub-bitstream of one or more attribute sub-bitstreams indicated in a parameter set is active, The parameter set may include a visual volumetric video-based parameter set. The message indicating one or more active attribute sub-bitstreams may be received by the decoder, A decoder may perform decoding, such as determining which attribute sub-bitstream to use for decoding visual media content, based on the one or more messages, The one or more messages may be generated and sent to a decoder, for example, to indicate the deactivation of the one or more attribute sub-bitstreams. The decoder may determine an inactive attribute sub-bitstream and skip the inactive attribute sub-bitstream for decoding the visual media content based on the one or more messages.

20 Claims, 10 Drawing Sheets

(58) Field of Classification Search
USPC .................................................. 375/240.25
See application file for complete search history.

(56) References Cited

OTHER PUBLICATIONS

ISO/IEC, "Information Technology—Dynamic Adaptive Streaming over HTTP (DASH)—Part 1: Media Presentation Description and Segment Formats", ISO/IEC 23009-1:2016(E), Sep. 25, 2018, 222 pages.
Aksu et al., "On DASH Streaming of V-PCC Data", Nokia Technologies, ISO/IEC JTC1/SC29/WG11 MPEG2019/m48117, Gothenburg, Sweden, Jul. 2019, 3 pages.
Aksu, Emre B., "Technologies Under Consideration for Carriage of Point Cloud Data", Systems, ISO/IEC JTC1/SC29/WG11 MPEG2018/N18414, Geneva, CH, Mar. 2019, 38 pages.
Hamza et al., "[Vpcc] SEI Messages for V-PCC Component Changes", InterDigital Communications, Inc., ISO/IEC JTC1/SC29/WG11 m49113, Gothenburg, SE, Jul. 2019, 5 pages.
ISO/IEC, "Continous Improvement of Study Text of ISO/IEC CD 23090-5 Video-Based Point Cloud Compression", 3DG, ISO/IEC JTC 1/SC 29/WG 11 N18479, Coding of Moving Pictures and Audio Convenorship: UNI (Italy), May 8, 2019, 140 pages.
ISO/IEC, "Use Cases for Point Cloud Compression (PCC)", ISO/IEC JTC1/SC29/WG11 MPEG2015/ N16331, Geneva, CH, Jun. 2016, 8 pages.
ISO/IEC, "WD of ISO/IEC 23090-10 Carriage of PC Data", Systems, ISO/IEC JTC 1/SC 29/WG 11 N18321, Coding of Moving Pictures and Audio Convenorship: UNI (Italy), Apr. 12, 2019, 10 pages.

* cited by examiner

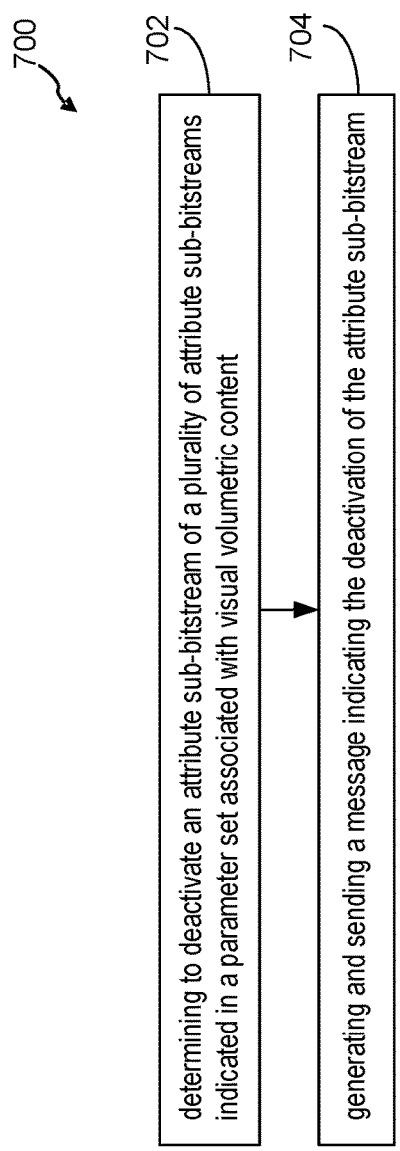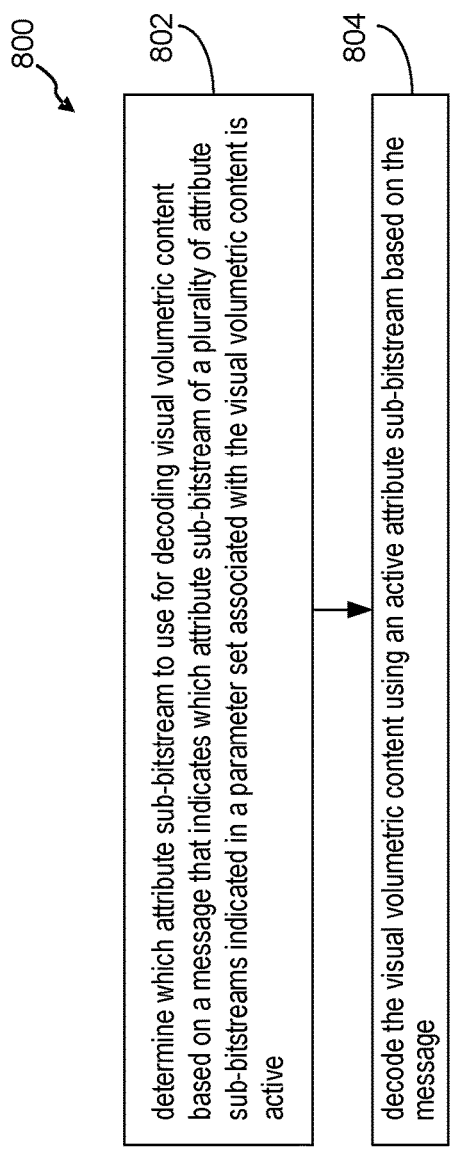

DYNAMIC ADAPTATION OF VOLUMETRIC CONTENT COMPONENT SUB-BITSTREAMS IN STREAMING SERVICES

CROSS REFERENCE TO RELATED APPLICATIONS

This application is the National Stage Entry under 35 U.S.C. § 371 of Patent Cooperation Treaty Application No. PCT/US2020/040667, filed Jul. 2, 2020, which claims priority to U.S. Provisional Patent Application No. 62/869,705, filed on Jul. 2, 2019, and entitled "Dynamic Adaptation of Point Cloud Component Substreams in Point Cloud Streaming Services," the entirety of which is incorporated by reference as if fully set forth herein.

BACKGROUND

Video coding systems may be used to compress digital video signals, for example, to reduce the storage and/or transmission bandwidth needed for such signals. Video coding systems may include, for example, wavelet-based systems, object-based systems, and/or block-based systems, such as a block-based hybrid video coding system.

SUMMARY

Systems, methods, and instrumentalities are disclosed for dynamic adaptation of visual volumetric content, such as point cloud component sub-bitstreams in point cloud streaming services. Dynamic adaptation of visual volumetric content may be based on one or more messages and/or parameter sets, which may indicate one or more changes in visual volumetric content. Changes may include, for example, changes in active attributes and/or codecs. For example, a bitrate adaptation process in a streaming session may (for example, based on an operating environment, such as resource availability, bandwidth attribute, client coding capabilities, and/or client rendering capabilities) add/drop one or more attributes for a video component and/or change a representation of a video component to a representation encoded with a different codec. One or more messages and/or parameter sets may be generated and sent to a decoder, for example, to indicate visual volumetric content processing information, which may include change indications. A decoder may perform decoding, such as determining which attribute sub-bitstream and/or codec to use for decoding, based on one or more messages and/or parameter sets.

The one or more messages and/or parameter sets may include, for example, a component codec change (CCC) message, an active attributes (AA) message, a component change parameter set (CCPS), and/or a parameter set activation (PSA) message. For example, visual volumetric content bitstream supplemental enhancement information (SEI) messages and/or parameter sets may support adaptive streaming of visual volumetric content. A message (for example, a CCC SEI message) may inform a decoder (for example, a visual volumetric content decoder) of codec changes to one or more visual volumetric content components, enabling a decoder to determine which video codecs to use for referenced components. A message (for example, an AA SEI message) may inform a decoder (for example, a visual volumetric content decoder) about attribute changes to one or more visual volumetric content components, enabling a decoder to determine which active attributes to use and inactive attributes to ignore for referenced components. A parameter set (for example, a CCPS) may include information about changes (for example, attributes or codecs) made to one or more visual volumetric content components with respect to a parameter set (for example, a sequence parameter set (SPS)), enabling a decoder to determine which video codecs and active attributes to use for referenced components. A message (for example, a PSA SEI message) may indicate which parameter sets are active for the visual volumetric content components, enabling a decoder to determine which video codecs and active attributes to use for referenced components. A decoder may determine, for example, based on a message and/or parameter set, which attribute sub-bitstream of a plurality of attribute sub-bitstreams indicated in a parameter set associated with visual volumetric content is active and decode the visual volumetric content using an active attribute sub-bitstream.

In examples, a message may indicate the set of attribute sub-bitstreams that are active for use in the decoding process for the visual volumetric content bitstream (for example, after the message is received), One or more messages and/or parameter sets may signal the activation of a subset of attribute component sub-streams in a visual volumetric content bitstream. One or more messages and/or parameter sets may signal codec changes for visual volumetric content component sub-streams. A visual volumetric content decoder may be configured, for example, to perform one or more of the following: obtain an indication that indicates whether at least one attribute signaled in a referenced parameter set is inactive; obtain arm active attribute indication (for example, the number of active attributes and their respective attribute indices), for example, if the indication indicates at least one attribute in the referenced parameter set is inactive; identify inactive attributes, for example, based on the active attribute indication; or skip the inactive attributes in the referenced parameter set during decoding.

In examples, a method may be implemented to perform dynamic adaptation of point cloud component sub-bitstreams in point cloud streaming services. The method may comprise determining to deactivate an attribute, sub-bitstream of a plurality of attribute sub-bitstreams indicated in a parameter set associated with visual volumetric content and generating a message as described herein, for example; to indicate the deactivation of the attribute sub-bitstream. The method may be implemented, for example, by an apparatus, such as a visual media content processing or coding apparatus. The visual media content processing or coding apparatus may include a DASH client or a streaming client, for example, a video-based point cloud compression (VPCC) client.

A method for decoding visual media content may comprise; for example, determining which attribute sub-bitstream to use for decoding visual volumetric content based on a message that indicates which attribute sub-bitstream of a plurality of attribute sub-bitstreams indicated in a parameter set associated with visual volumetric content is active; and decoding the visual volumetric content using an active attribute sub-bitstream based on the message. The attribute indicated in the parameter set may characterize the visual media content.

A method for processing visual media content may comprise, for example, determining to deactivate an attribute sub-bitstream of a plurality of attribute sub-bitstreams indicated in a parameter set associated with visual volumetric content; and generating a message indicating the deactivation of the attribute sub-bitstream.

A method for decoding visual media content may comprise, for example, obtaining a parameter set associated with visual volumetric content; receiving a message that indicates which attribute sub-bitstream of a plurality of attribute sub-bitstreams indicated in the parameter set is active; determining an active attribute sub-bitstream and an inactive attribute sub-bitstream based on the message; and decoding the visual volumetric content using the active attribute sub-bitstream and skipping the inactive attribute sub-bitstream.

The message may be signaled in a bitstream. The message may comprise a supplemental enhancement information (SEI) message. The message rosy have a persistence scope that persists until an end of a bitstream. The message may have a persistence scope that persists until another message that is different from the message is received. The message may comprise an indicator that indicates a number of active attribute sub-bitstreams of the plurality of attribute sub-bitstreams indicated in the parameter set associated with visual volumetric content.

The parameter set may comprise a visual volumetric parameter set that comprises attribute information. The message may refer to a piece of the attribute information for the active attribute sub-bitstream. The parameter set may indicate a plurality of attributes. The message may comprise an indicator that the plurality of attribute sub-bitstreams indicated in the parameter set are active.

The parameter set may indicate map information associated with a respective attribute sub-bitstream of the plurality of attributes. The message may indicate which map information is active, for example, by indicating which attribute sub-bitstream of the plurality of attribute sub-bitstreams indicated in the parameter set is active. The visual volumetric content may be decoded using active map information, for example, map information associated with the active attribute sub-bitstream.

The plurality of attribute sub-bitstreams may indicate, for example, texture information, material information, transparency information, and/or reflectance information associated with the visual volumetric content. An inactive attribute sub-bitstream may be determined based on the message. The inactive attribute sub-bitstream may be skipped for the decoding of the visual volumetric content. An attribute sub-bitstream that is indicated in the parameter set but not indicated in the message may be determined to be an inactive attribute sub-bitstream. The inactive attribute sub-bitstream may be skipped for the decoding of the visual volumetric content.

Deactivation of an attribute sub-bitstream may be indicated by a message, for example, by not referring to an indicator associated with the attribute sub-bitstream indicated in the parameter set. Deactivation of an attribute sub-bitstream may be determined, for example, based on bitrate adaptation.

One or more methods herein may be implemented by an apparatus comprising one or more processors configured to execute computer executable instructions, which may be stored on a computer readable medium or a computer program product, that, when executed by the one or more processors, performs the one or more methods. The apparatus may, thus, comprise one or more processors configured to perform the one or more methods. The computer readable medium or the computer program product may comprise instructions that cause one or more processors to perform the one or more methods by executing the instructions. A computer readable medium may contain data content generated according to the one or more methods. A signal may comprise a message according to the one or more methods. A device may comprise an apparatus, such as a visual media content processing or coding apparatus. A device may comprise a television, a cellular phone, a tablet or a set-top box. A device may comprise at least one of (i) an antenna configured to receive a signal, the signal including data representative of an image, (ii) a band limiter configured to limit the received signal to a band of frequencies that includes the data representative of the image, or (iii) a display configured to display the image.

Each feature disclosed anywhere herein is described, and may be implemented, separately/individually and in any combination with any other feature disclosed herein and/or with any feature(s) disclosed elsewhere that may be impliedly or expressly referenced herein or may otherwise fall within the scope of the subject matter disclosed herein.

BRIEF DESCRIPTION OF THE DRAWINGS

FIG. 10 is a system diagram illustrating an example radio access network (RAN) and an example core network (CN) that may be used within the communications system illustrated in FIG. 1A according to an embodiment.

FIG. 7 illustrates an example of a method for processing visual volumetric content based on messaging (for example, a message shown in Table 5).

FIG. 8 illustrates an example of a method for processing visual volumetric content based on messaging (for example, a message shown in Table 5).

DETAILED DESCRIPTION

A detailed description of illustrative embodiments will now be described with reference to the various Figures, Although this description provides a detailed example of possible implementations, it should be noted that the details are intended to be exemplary and in no way limit the scope of the application.

Figure 1A:
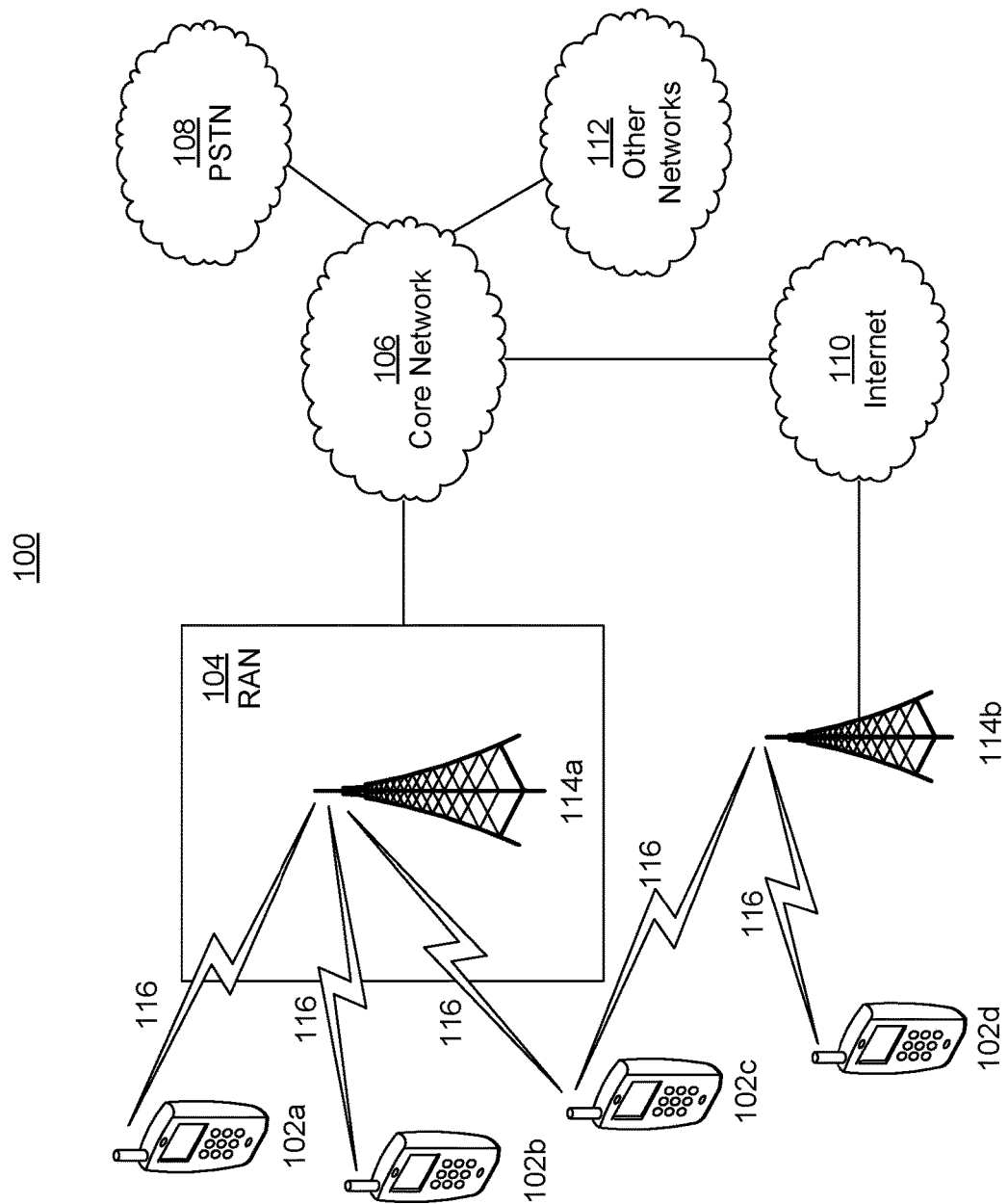
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content; such as voice; data, video; messaging, broadcast; etc., to multiple wireless users. The communications system 100 may enable multiple wireless users to access such content through the sharing of system resources; including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique, word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (FDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like, Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE A) and/or LTE-Advanced Pro (LTE-A Pro).

In an embodiment, the base station 114a and the WTRUs 102a, 102b, 102c may implement a radio technology such as NR Radio Access which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WMAX)), CDMA2000, CDMA2000 1x, CDMA2000 EV-DO, Interim Standard 2000 (IS-2000), Interim Standard 95 (IS-95), interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Horne Node B, Horne eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112, The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP Internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
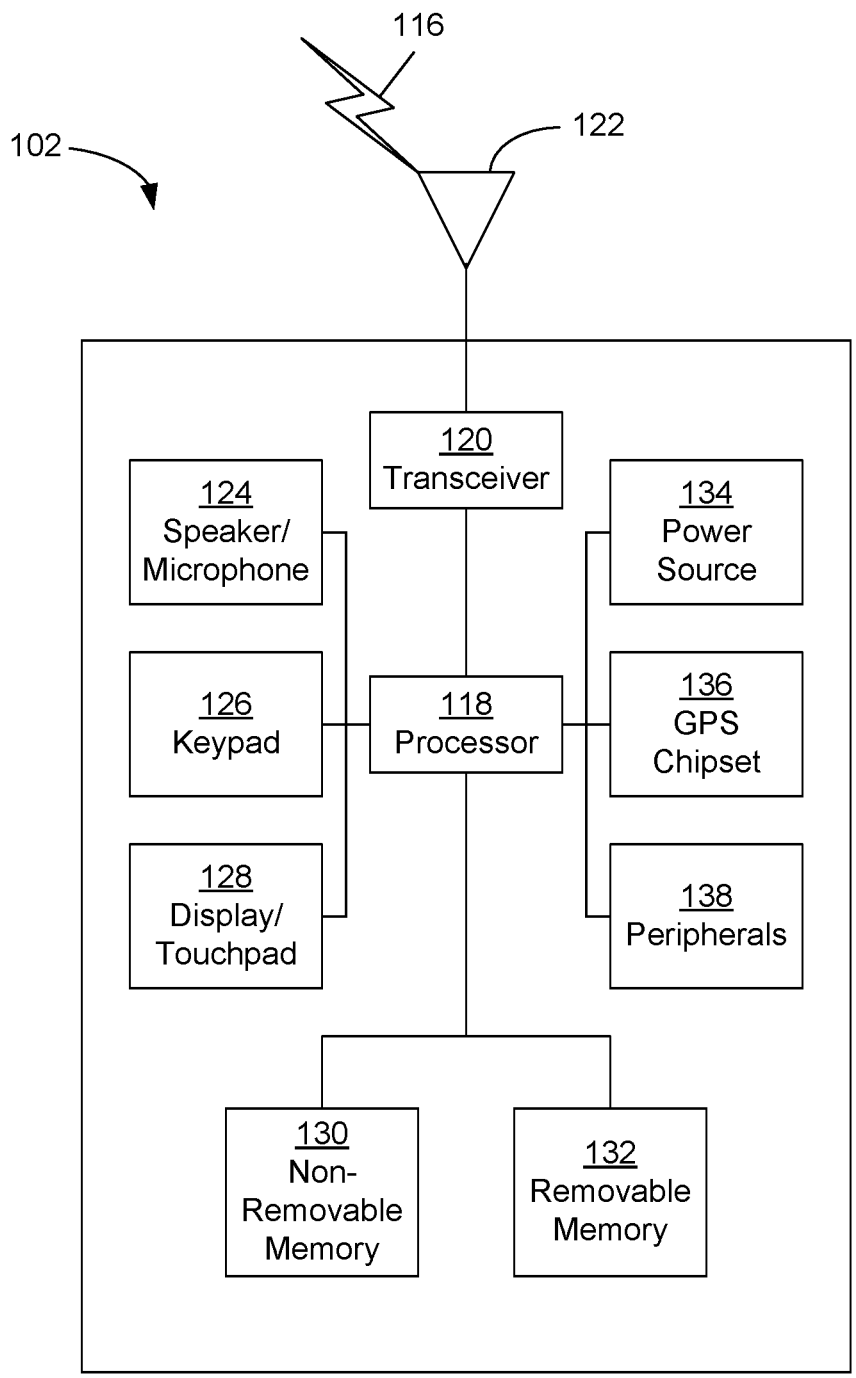
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor; a conventional processor; a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g.; nickel-cadmium (NiCd), nickel-zinc (NiZn), nickel metal hydride (NiMH); lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations, it will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass; a satellite transceiver; a digital camera (for photographs and/or video); a universal serial bus (USB) port; a vibration device, a television transceiver; a hands free headset, a Bluetooth® module, a frequency modulated (FM) radio unit, a digital music player, a media player, a video game player module, an Internet browser; a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter; a light sensor, a touch sensor; a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g.; a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above; the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c; though it will be appreciated that the RAN 104 may include any number of eNode-Bs while remaining consistent with an embodiment. The eNode-Bs 160a, 1601), 160c may each include one or more transceivers for communicating with the WTRUs 102a, 102b, 102c over the air interface 116. In one embodiment, the eNode-Bs 160a, 160b, 160c may implement MIMO technology. Thus; the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 1600 may communicate with one another over an X2 interface.

Figure 1C:
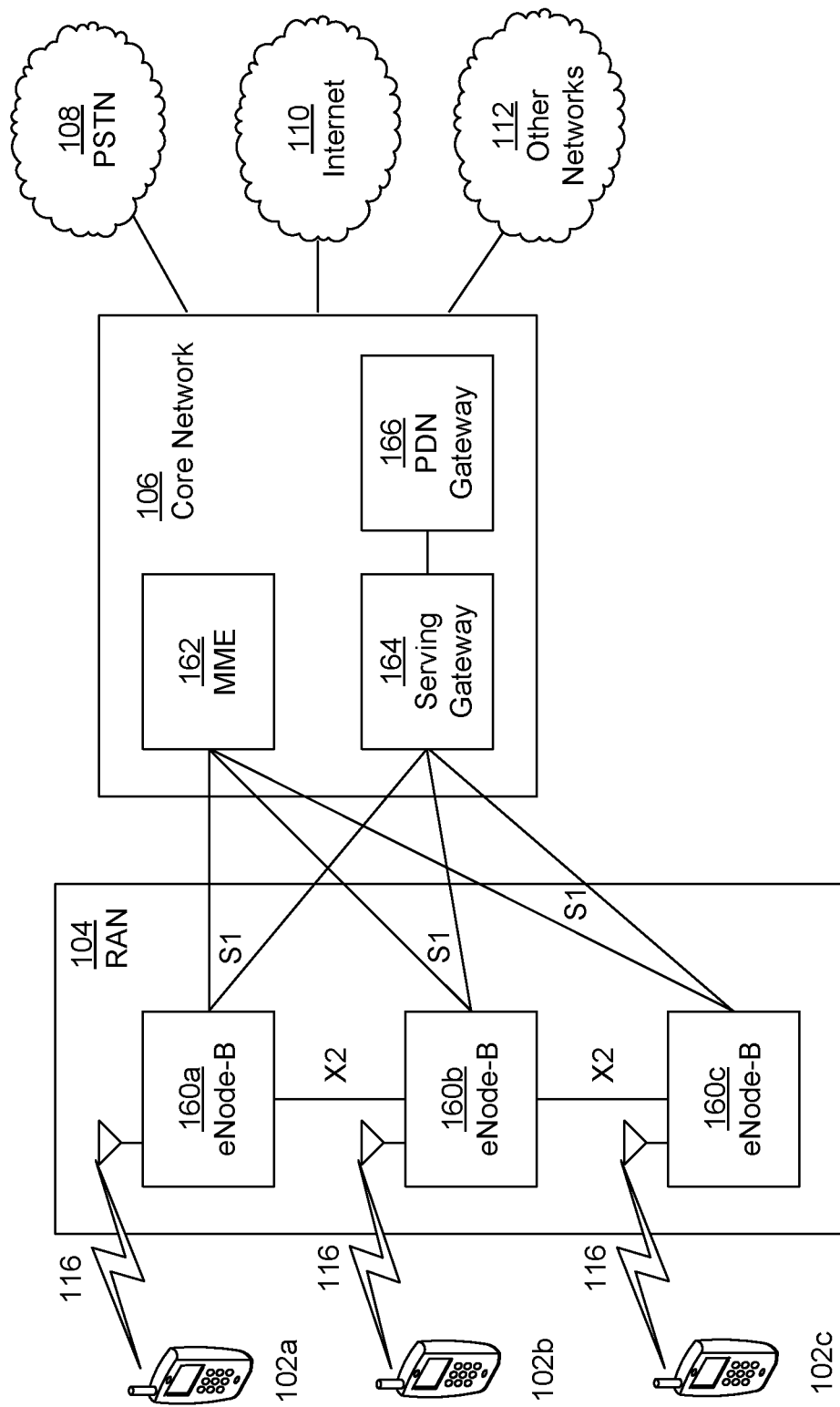
FIG. 1D is a system diagram illustrating a further example RAN and a further example CN that may be used within the communications system illustrated in FIG. 1A according to an embodiment.

The CN 106 shown in FIG. 1C may include a mobility management entity (MME) 162, a serving gateway (SGW) 164, and a packet data network (PDN) gateway (or PGW) 166, While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Be 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs, Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area, MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AR, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AR, the entire available frequency bands may be considered busy even though a majority of the frequency bands remains idle and may be available.

Figure 1D:
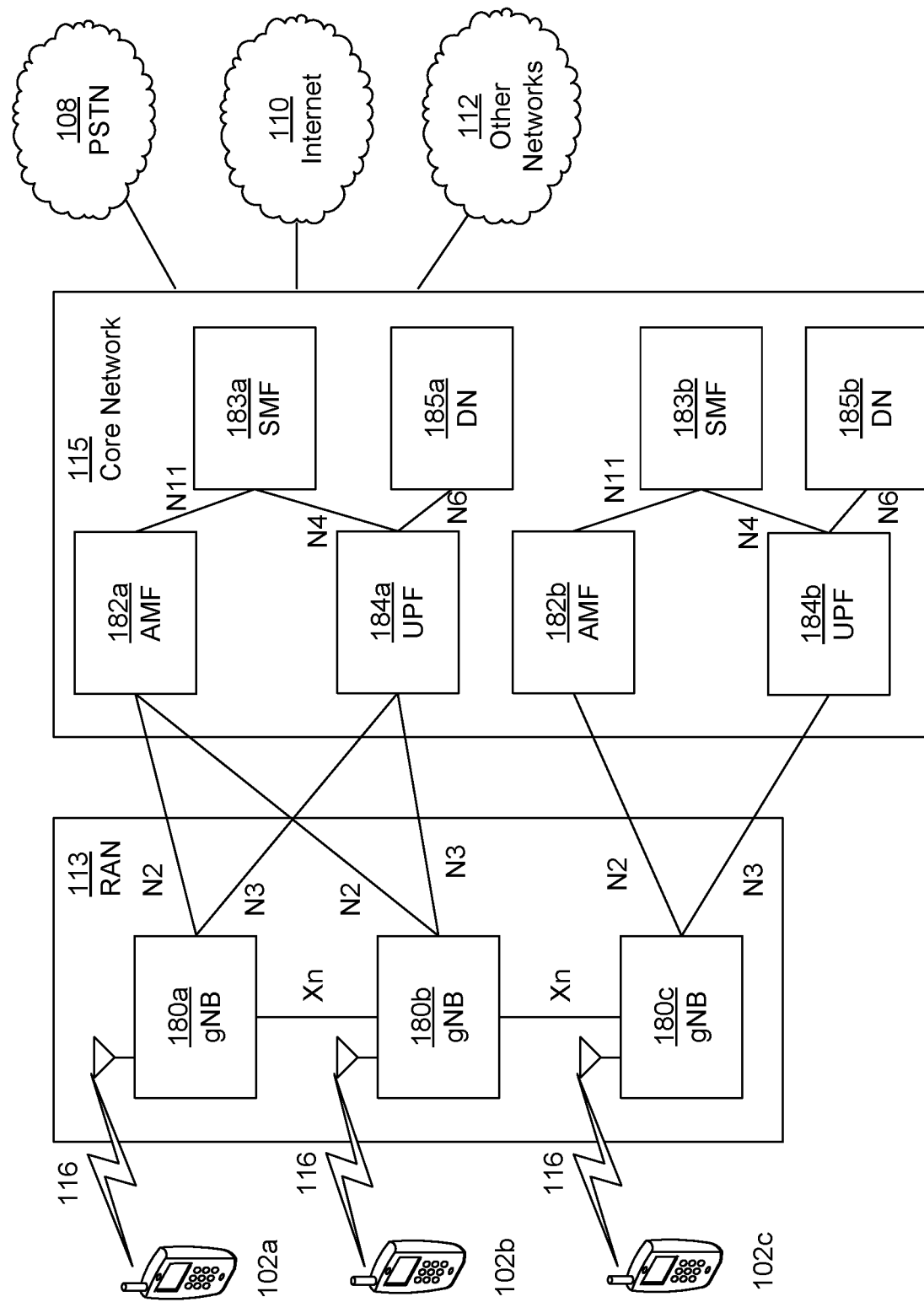

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code, FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 1800. Thus, the gNB 180a, for example, may use multiple antennas to transmit wireless signals to, and/or receive wireless signals from, the WTRU 102a in an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (ills) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LIE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition; the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b, and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown), The emulation devices may be one or more devices configured to emulate one or more; or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples or embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-8 described herein may provide some embodiments, but other embodiments are contemplated. The discussion of FIGS. 5-8 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
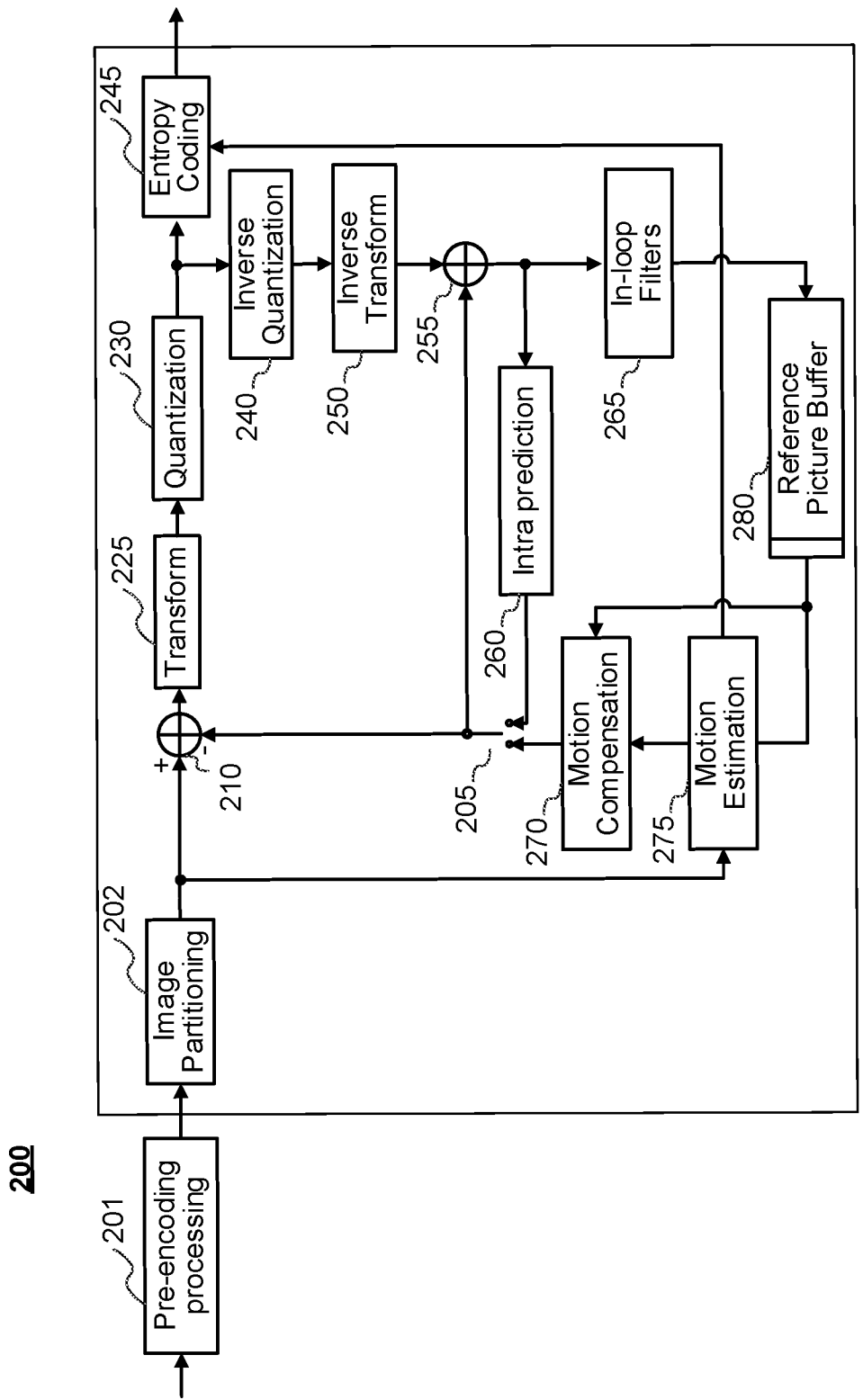
FIG. 2 is a diagram showing an example video encoder.
Figure 3:
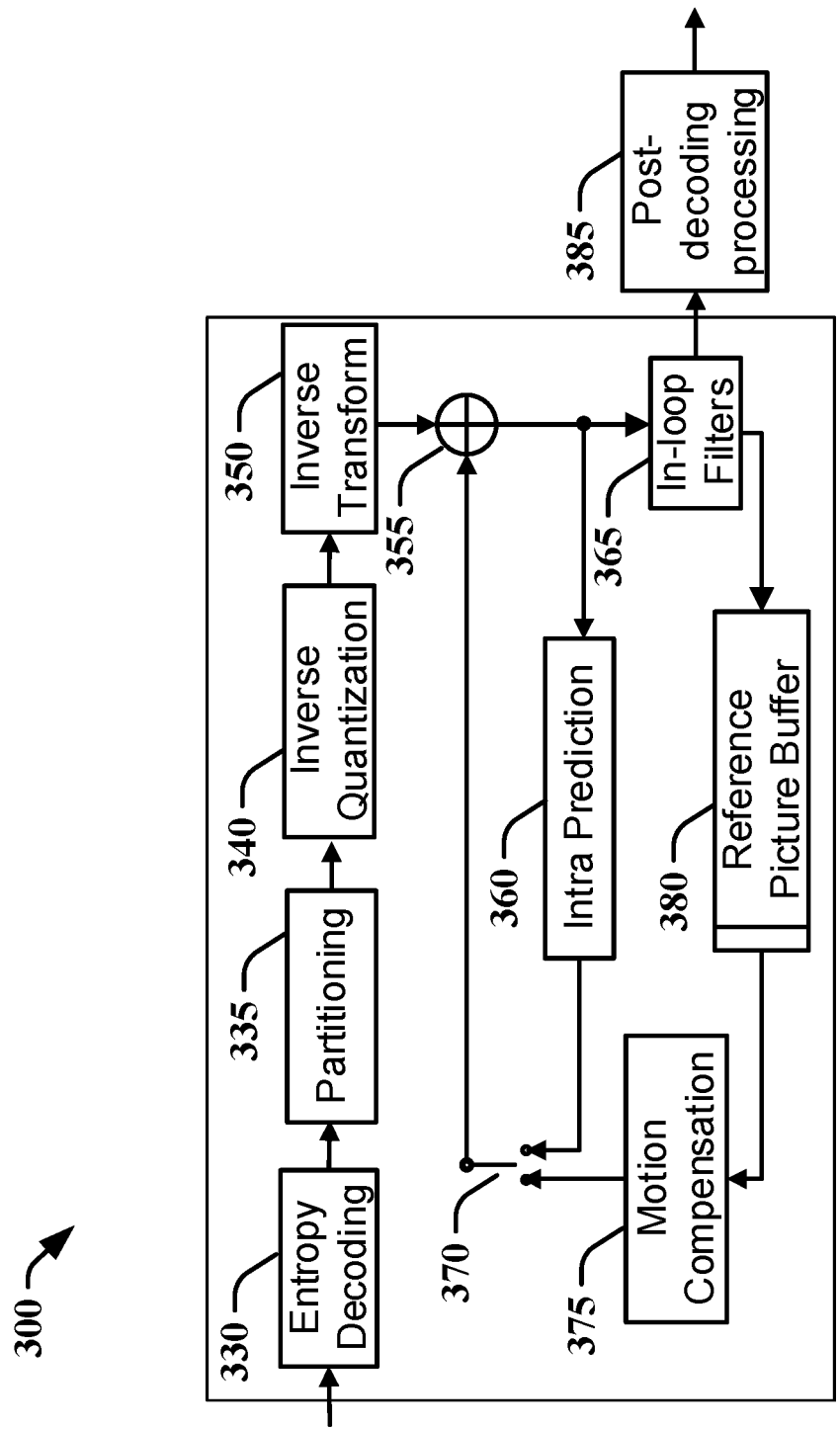
FIG. 3 is a diagram showing an example of a video decoder.

Various methods and other aspects described in this application may (for example, be used to) modify modules, for example, intra prediction and entropy coding and/or decoding modules (260, 360, 245, 330), of a video encoder 200 and decoder 300 as shown in FIG. 2 and FIG. 3. Moreover, the subject matter disclosed herein presents aspects that are not limited to VVC or HEVC, and may be applied, for example, to any type, format or version of video coding, whether described in a standard or a recommendation, whether pre-existing or future-developed, and extensions of any such standards and recommendations (e.g., including VVC and HEVC). Unless indicated otherwise, or technically precluded, the aspects described in this application may be used individually or in combination.

Various numeric values are used in examples described the present application, such as bit value logic (for example, logic for value of 0 or 1), numeric value ranges (for example, 0 to 255), a payloadType value for the CCC SEI message is 12, a payloadType value for the AA SEI message is 13, etc.

These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing arm example of a video decoder. In example decoder 300, a bitstream is decoded by the decoder elements as described below. Video decoder 300 generally performs a decoding pass reciprocal to the encoding pass as described in FIG. 2. The encoder 200 may also generally perform video decoding as part of encoding video data. For example, the encoder 200 may perform one or more of the video decoding steps presented herein. The encoder reconstructs the decoded images, for example, to maintain synchronization with the decoder with respect to one or more of the following: reference pictures, entropy coding contexts, and other decoder-relevant state variables.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Figure 4:
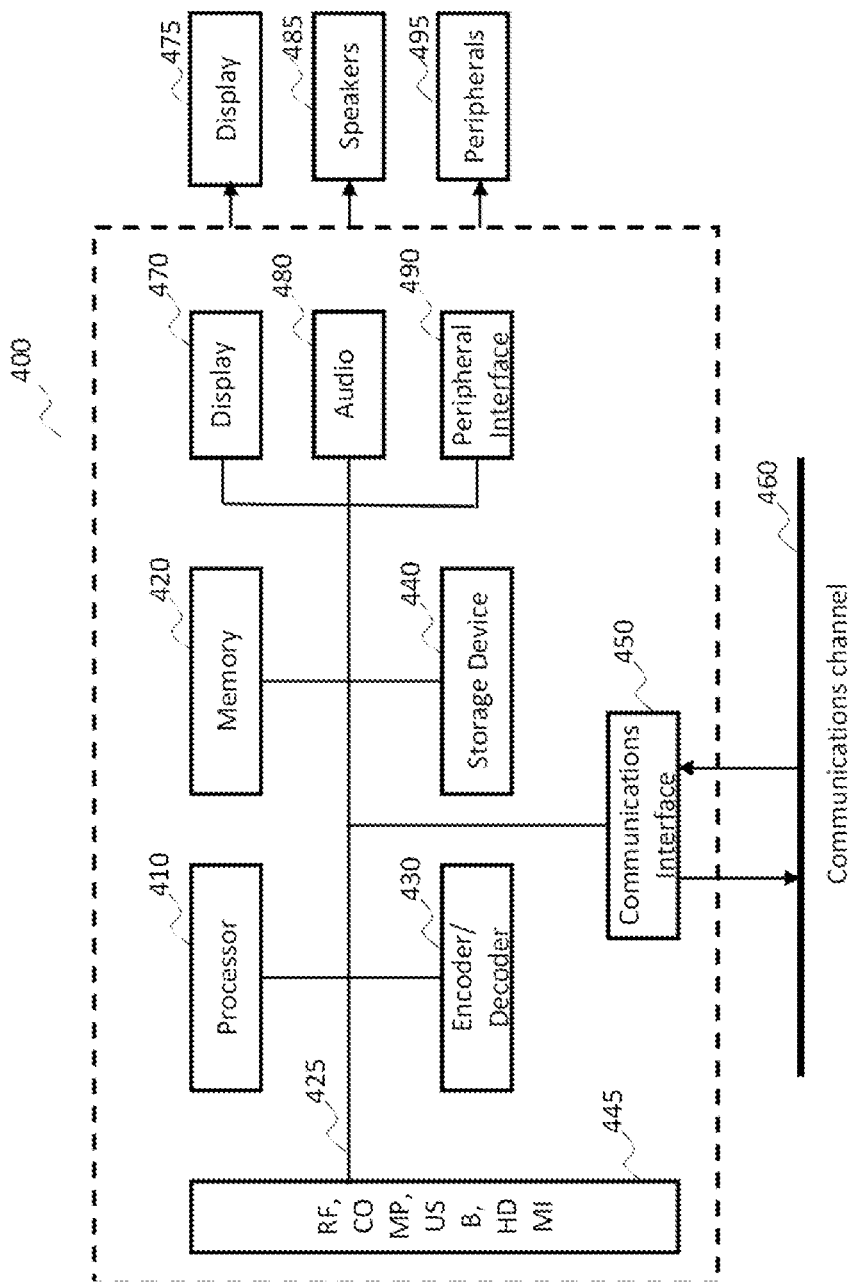
FIG. 4 is a diagram showing an example of a system in which various aspects and examples may be implemented.

FIG. 4 is a diagram showing an example of a system in which various aspects and embodiments described herein may be implemented. System 400 may be embodied as a device including the various components described below and is configured to perform one or more of the aspects described in this document, Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various embodiments, the system 400 is communicatively coupled to one or more other systems, or other electronic devices, via, for example, a communications bus or through dedicated input and/or output ports. In various embodiments, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device), System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various embodiments, one or more of processor 410, memory 420, storage device 440, and encoder/decoder module 430 can store one or more of various items during the performance of the processes described in this document, Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 410 and/or the encoder/decoder module 430 is used to store instructions and to provide working memory for processing that is needed during encoding or decoding. In other embodiments, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as, for example, MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various embodiments, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing. Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various embodiments, using a wireless network such as a Wi-Fi network, for example IEEE 802.11 (IEEE refers to the institute of Electrical and Electronics Engineers), The Wi-Fi signal of these examples is received over the communications channel 460 and the communications interface 450 which are adapted for Wi-Fi communications. The communications channel 460 of these embodiments is typically connected to an access point or router that provides access to external networks including the Internet for allowing streaming applications and other over-the-top communications. Other embodiments provide streamed data to the system 400 using a set-top box that delivers the data over the HDMI connection of the input block 445. Still other embodiments provide streamed data to the system 400 using the RF connection of the input block 445. As indicated above, various embodiments provide data in a non-streaming manner. Additionally, various embodiments use wireless networks other than Wi-Fi, for example a cellular network or a Bluetooth network.

The system 400 can provide an output signal to various output devices, including a display 475, speakers 485, and other peripheral devices 495. The display 475 of various embodiments includes one or more of, for example, a touchscreen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples of embodiments, one or more of a stand-alone digital video disc (or digital versatile disc) (DVR, for both terms), a disk player, a stereo system, and/or a lighting system. Various embodiments use one or more peripheral devices 495 that provide a function based on the output of the system 400. For example, a disk player performs the function of playing the output of the system 400.

In various embodiments, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various embodiments, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various embodiments in which the display 475 and speakers 485 are external components, the output signal may be provided via dedicated output connections, including, for example, HDMI ports, USB ports, or COMP outputs.

The embodiments may be carried out by computer software implemented by the processor 410 or by hardware, or by a combination of hardware and software. As a non-limiting example, the embodiments may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, determining which attribute sub-bitstream to use for decoding visual volumetric content based on a message that indicates which attribute, sub-bitstream indicated in a parameter set associated with the visual volumetric content is active; decoding the visual volumetric content using an active attribute sub-bitstream; obtaining a parameter set comprising attribute information for attributes that characterize visual volumetric content; receiving a message that indicates that indicates which attribute, sub-bitstream of a plurality of attribute sub-bitstreams indicated in a parameter set associated with the visual volumetric content is active; determining an active attribute sub-bitstream and an inactive attribute sub-bitstream based on the message; receiving the active attribute sub-bitstream; decoding the visual volumetric content using the active attribute sub-bitstream and skip the inactive attribute sub-bitstream; determining an inactive attribute sub-bitstream based on a message; determining that an attribute sub-bitstream indicated in the parameter set but not indicated in the message is an inactive attribute sub-bitstream; skipping the inactive attribute sub-bitstream for the decoding of the visual volumetric content; etc.

As further embodiments, in one example "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding"; "encoding" as used in this application can encompass ail or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, determining to deactivate an attribute sub-bitstream of a plurality of attribute sub-bitstreams indicated in a parameter set associated with visual volumetric content; determining to deactivate an attribute sub-bitstream of a plurality of attribute sub-bitstreams indicated in a parameter set associated with the visual volumetric content based on bitrate adaptation; generating and sending a message indicating the deactivation of the attribute sub-bitstream; etc.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, such as syntax elements indicated in Tables 1-7 and otherwise in discussion or figures presented herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

During the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options, Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment," "an embodiment," "an example," "one implementation" or "an implementation," as well as other variations thereof, means that a particular feature, structure, characteristic, and so forth described in connection with the embodiment is included in at least one embodiment. Thus, the appearances of the phrase "in one embodiment," "in an embodiment," "in an example," "in one implementation," or "in an implementation", as well any other variations, appearing in various places throughout this application are not necessarily all referring to the same embodiment or example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in some embodiments the encoder signals (e.g., to a decoder) changes to video component sub-bitstreams for decoding, video component codec changes or active/inactive codecs for decoding, video component attribute changes or active/inactive attributes for decoding, video component attribute set changes or active/inactive parameter sets for decoding, etc. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example; encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The examples described herein may be applicable to 3D content. The examples described herein may be applicable to visual volumetric content. Visual volumetric content may be captured in point clouds. Visual volumetric content may be captured in immersive video content. The examples described herein may be applicable to video-based point cloud compression (V-PCC) or visual volumetric video-based coding (V3C). For example, although certain examples may be described in terms of V-PCC, the examples may be equally applicable to V3C. Thus, in a sense these terms may be interchangeably used, and examples described in terms of V-PCC may be equally applicable to V3C.

3D point clouds may be used to represent 3D content (for example, immersive media). A point cloud may include a set of points represented in three dimensional (3D) space, A (for example, each) point may be associated with coordinates that indicate the location of the point and/or one or more attributes (for example, point color, transparency, time of acquisition, reflectance of laser or material property, etc.). Point clouds may be captured or deployed, for example, using one or more cameras, depth sensors, and/or light detection and ranging (LiDAR) laser scanners. Point clouds may comprise a plurality of points, A (for example, each) point may be represented by a set of coordinates (for example, x, y, z coordinates) that map in three-dimensional (3D) space. A point may be generated based on the sampling of an object. In examples, the number of points within a point cloud may be on the order of millions or billions. A point cloud may be used to reconstruct one or more objects and/or scenes.

V3C including decoding and encoding may be used to process the 3D content. Volumetric content may be represented and/or compressed, for example, to be efficiently stored and transmitted. Volumetric content may include visual volumetric content. Visual volumetric content may be processed based on visual volumetric video-based coding (V3C) and/or video-based point cloud compression (V-PCC). Visual volumetric content may include V3C content or V-PCC content.

V3C may be based on point cloud compression. Point cloud compression may support lossy and/or lossless coding (for example, encoding or decoding) of a point cloud's geometric coordinates and/or attributes. Point clouds may be deployed to support various applications (for example, telepresence, virtual reality (VR), and large-scale dynamic 3D maps).

Figure 5:
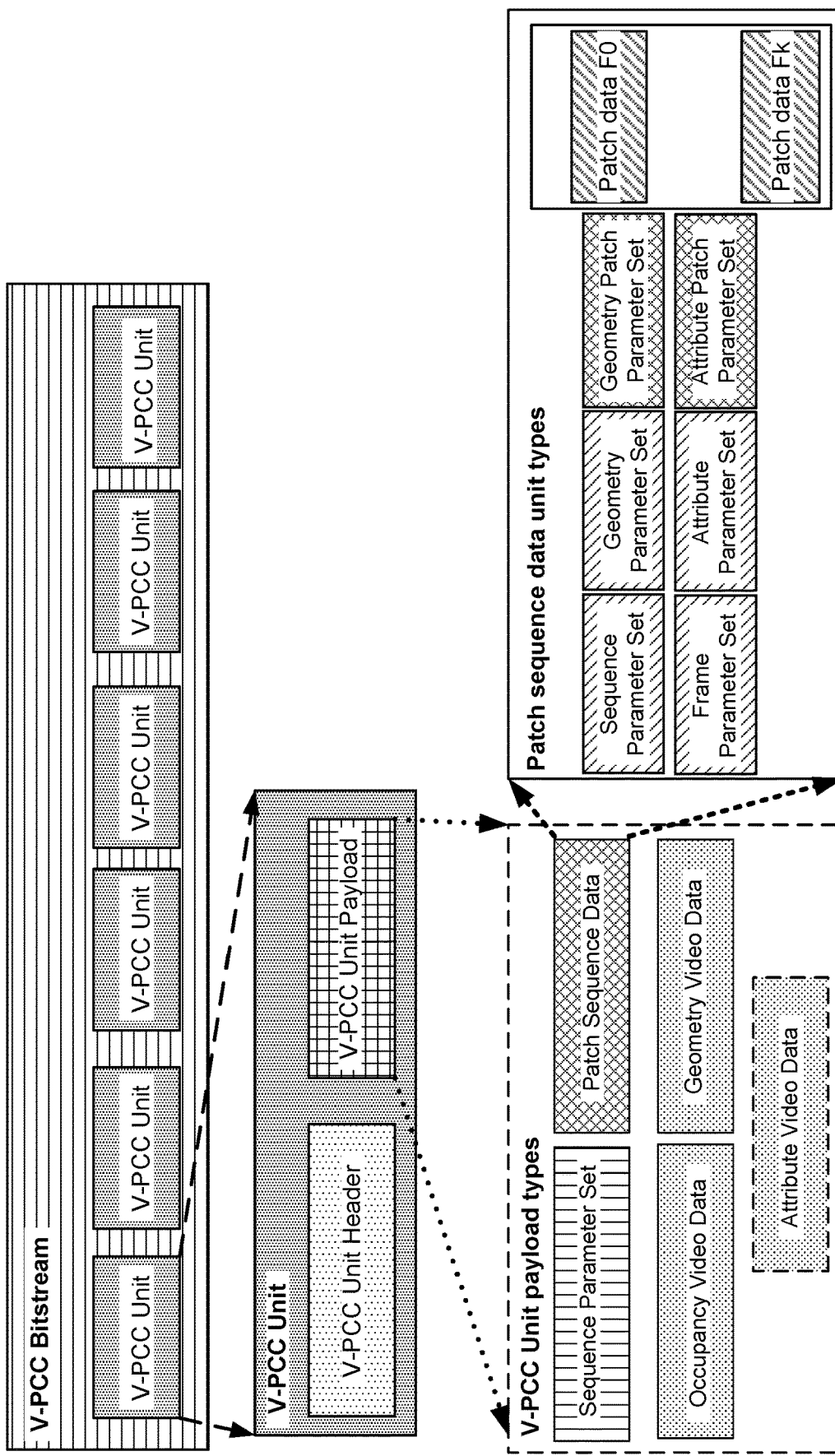
FIG. 5 illustrates an example of a bitstream structure for a video-based point cloud compression (V-PCC).

FIG. 5 illustrates an example of a bitstream structure for video-based point cloud compression (V-PCC). As illustrated in FIG. 5, a video bitstream(s) may be generated, A V-PCC bitstream may be generated, for example, by multiplexing generated video bitstream(s) and respective metadata together.

A V-PCC bitstream may include a set of V-PCC units, for example, as illustrated in FIG. 5. Table 1 shows an example of syntax for a V-PCC unit, which may include a V-PCC unit header and a V-PCC unit payload. Table 2 shows an example of syntax for a V-PCC unit header. Table 3 shows an example of syntax for a V-PCC unit payload. A V-PCC unit header may include an indication of a V-PCC unit type (for example, as illustrated in Table 2). In examples, V-PCC units with unit types VPCC_OVD, VPCC_GVD, or VPCC_AVD, may include, for example, occupancy, geometry, and/or attribute data units. The three components, occupancy, geometry, and/or attribute data units, may be used to reconstruct a visual volumetric content (for example, represented by a point cloud). A V-PCC attribute unit header may indicate an attribute type and an index that may be associated with the attribute type. There may be multiple instances of an attribute type.

A payload comprising occupancy, geometry, and attribute V-PCC units may correspond to video data units (for example, network abstraction layer (NAL) units) that may be decoded by a video coder (for example, a decoder), which may be specified in a corresponding occupancy, geometry, and attribute parameter set V-PCC unit.

TABLE 1 example of syntax for a V-PCC unit

| | Descriptor |
|---|---|
| vpcc_unit( ) {<br>  vpcc_unit_header( )<br>  vpcc_unit_payload( )<br>} | |

TABLE 2 example of syntax for a V-PCC unit header

| | Descriptor |
|---|---|
| vpcc_unit_header( ) { | |
|   vpcc_unit_type | u(5) |
|   if( vpcc_unit_type = = VPCC_AVD \|\| vpcc_unit_type = = VPCC_GVD \|\|<br>    vpcc_unit_type = = VPCC_OVD \|\| vpcc_unit_type = = VPCC_PDG ) | |
|     vpcc_sequence_parameter_set_id | u(4) |
|   if( vpcc_unit_type = = VPCC_AVD ) { | |
|     vpcc_attribute_index | u(7) |
|     vpcc_attribute_dimension_index | u(7) |
|     if( sps_multiple_layer_streams_present_flag ) { | |
|       vpcc_layer_index | u(4) |
|       pcm_separate_video_data( 4 ) | |
|     } | |
|     else | |
|       pcm_separate_video_data( 8 ) | |
|   } else if( vpcc_unit_type = = VPCC_GVD ) { | |
|     if( sps_multiple_layer_streams_present_flag ) { | |
|       vpcc_layer_index | u(4) |
|       pcm_separate_video_data( 18 ) | |
|     } | |
|     else | |
|       pcm_separate_video_data( 22 ) | |
|   } else if( vpcc_unit_type = = VPCC_OVD \|\| vpcc_unit_type = = VPCC_PDG )<br>{ | |
|     vpcc_reserved_zero_23bits | u(23) |
|   } else | |
|     vpcc_reserved_zero_27bits | u(27) |
| } | |

TABLE 3 example of syntax for a V-PCC unit payload

| | Descriptor |
|---|---|
| vpcc_unit_payload( ) {<br>  if( vpcc_unit_type = = VPCC_SPS )<br>    sequence_parameter_set( )<br>  else if( vpcc_unit_type = = VPCC_PDG )<br>    patch_data_group( ) | |

TABLE 3-continued example of syntax for a V-PCC unit payload

| | Descriptor |
|---|---|
|   else if( vpcc_unit_type = = VPCC_OVD \|\|<br>    vpcc_unit_type = = VPCC_GVD \|\|<br>    vpcc_unit_type = = VPCC_AVD)<br>    video_data_unit( )<br>} | |

One or more messages (for example, supplemental enhancement information messages) may be used to assist one or more processes related to coding (for example, encoding or decoding), reconstruction, display, etc., of media content.

Changes in network delivery conditions may be dynamically adapted. For example, MPEG dynamic adaptive streaming over HTTP (MPEG-DASH) is a delivery format that may dynamically adapt to changes in network delivery conditions, for example, to provide end users experience.

Dynamic HTTP streaming may deliver multimedia content at one or more bitrates that may be available at a server. Multimedia content may include of a plurality of media components (for example, audio, video, text). Different media components may have different characteristics. Characteristics of media components may be described, for example, by a media presentation description (MPD).

Figure 6:
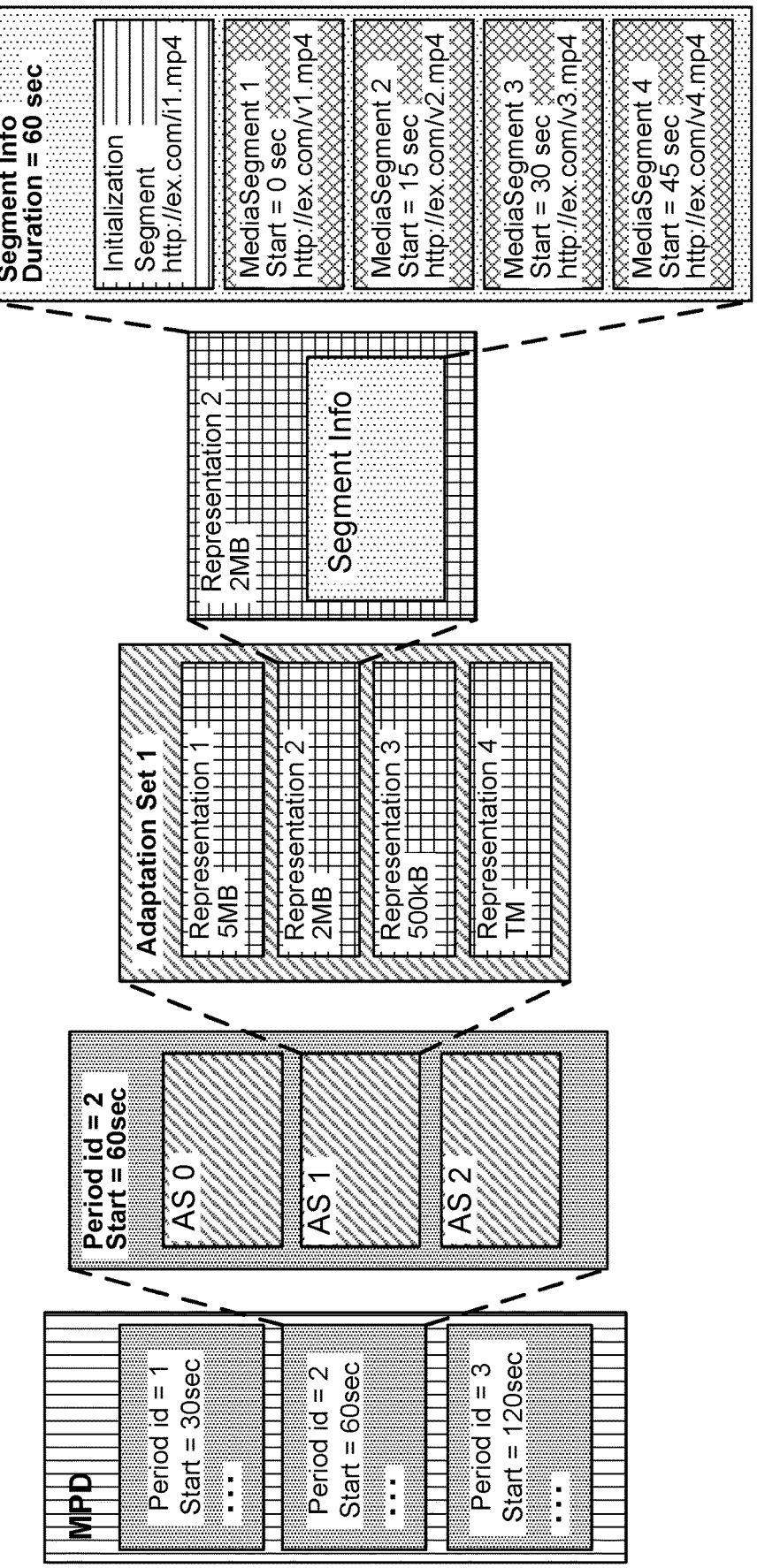
FIG. 6 illustrates an example Media Presentation Description (MPD) hierarchical data model.

FIG. 6 illustrates an example MPD hierarchical data model. As illustrated in FIG. 6, the MPD may describe a sequence of periods (for example, time intervals), For example, a set of encoded versions of media content components may not change during a period. A period may be associated with a start time and a duration. A period may be comprised of one or more adaptation sets (for example, an AdaptationSet, such as Adaptation Set I illustrated in FIG. 6). A DASH streaming client may be a WTRU, for example, as described herein with respect to FIGS. 1A-D.

An adaptation set may represent a set of encoded versions of one or more (for example, several) media content components sharing one or more (for example, identical) properties, such as one or more of language, media type, picture aspect ratio, role, accessibility, viewpoint, rating property, and/or the like). In examples, an AdaptationSet may include different bitrates for a visual component of a multimedia content. An AdaptationSet may include different bitrates for an audio component (for example, lower quality stereo and/or higher quality surround sound) of (for example, the same) multimedia content. An AdaptationSet may include multiple Representations.

A Representation may describe a deliverable encoded version of one or more (for example, several) media components. A Representation may vary from other representations, for example, by bitrate, resolution, number of channels, and/or other characteristics. A Representation may include one or more segments. Attributes of a Representation element (for example, @id, @bandwidth, @qualityRanking, and @dependencyId) may (for example, be used to) specify one or more properties of the Representation.

A Segment may be retrieved with a request (for example, an HTTP request). A (for example, each) segment may have a URL (for example, an addressable location on a server. A segment may be downloaded, for example, using HTTP GET or HTTP GET with byte ranges.

A DASH client may parse an MPD XML document. A DASH client may select a collection of AdaptationSets (for example, suitable for its environment), for example, based on the AdaptationSet's elements. A client may select a (for example, one) Representation for an (for example, within each) AdaptationSet. The client may select the Representation, for example, based on the value of @bandwidth attribute, client coding capabilities, and/or client rendering capabilities. A client may download an initialization segment of a selected Representation. A client may access content (for example, by requesting entire segments or byte ranges of segments). A client may continue consuming media content, for example, after a presentation has started or during a presentation. A client may request (for example, continuously request) media segments and/or parts of media segments during a presentation. A client may play content according to a media presentation timeline. A client may switch from a first Representation to a second Representation, for example, based on updated information from the client's environment. A client may play the content continuously, for example, across two or more Periods. A media presentation (for example, being consumed by a client in segments) may be terminated, a period may be started, and/or an MPD may be re-fetched, for example, towards the end of announced media in a Representation.

Changes in volumetric content component sub-streams (for example, changes in active attributes and/or codec) may be signaled to a decoder. Changes may be caused, for example, by a bitrate adaptation process in a streaming session.

Multimedia applications, such as virtual reality (VR) and immersive 3D graphics, may be implemented with or represented by 3D point clouds, which may enable updated forms of interaction and/or communication with a virtual world. Dynamic volumetric content (for example, represented by point clouds) may generate a large volume of information. Efficient coding algorithms may be used to compress volumetric content, for example, to reduce storage and/or transmission resource utilization by volumetric content. For example, a bitstream of compressed dynamic volumetric content may utilize fewer transmission resources than a bitstream of uncompressed information.

DASH may be used to carry (for example, stream) volumetric content information/data. DASH signaling may support DASH volumetric content data streaming. Volumetric content bitstreams may comprise a multiple component sub-streams, which may increase the number of dimensions for bitrate adaptation, A computing device (for example, a DASH client, such as a smartphone) may have multiple video codec instances per codec. The DASH client (for example, a WTRU) may (for example, dynamically) select among coded media versions of volumetric content components, for example, based on or to manage media processing capacity or capabilities. The DASH client may be a WTRU.

Dynamic selection of a coded media version for a volumetric content component may be based on, for example, the number of instances, resolution, and/or codec type supported by a client. Support for dynamic selection may be implemented, for example, in high-level syntax. For example, a V-PCC track may comprise a V-PCC sequence parameter set (SPS), such as a VPCC_SPS, which may include codec identifiers (IDs) for video coded component sub-streams. Switching between different codecs may be implemented, for example, by using multiple VPCC_SPS units with different codec ID combinations for component sub-streams. Content creators may or may not generate different V-PCC tracks that include different combinations of codecs and resolutions.

Certain attribute components may not be used in the reconstruction of volumetric content, Bitrate adaptation (for example, available to a streaming client) may include or may be implemented by, for example, dropping (for example, not downloading or deactivating) attribute sub-bitstreams that may not be used to reconstruct a volumetric content (e.g., point cloud). The number of attributes used for reconstruction of a volumetric content and their respective indices may be stored in a VPCC_SPS unit. A volumetric content decoder may (for example, be configured to) handle changes in the number of attributes without re-initialization with a new SFS, for example, based on supplemental enhancement information (SEI) messages, such as a component codec change (CCC) SEI message.

A visual media content processing device (for example, an encoder or a decoder) may drop an attribute, which may include, for example, not downloading an attribute or information pertaining to or associated with an attribute. A decoder may skip or ignore inactive attributes, which may include, for example, not decoding, not assigning a decoder, not expecting or receiving not updating data, not using, inactive attributes or information pertaining to or associated with inactive attributes in a video bitstream (for example, inactive attribute sub-bitstreams), and/or the like.

Substream, sub-stream and sub-bitstream may be used interchangeably to refer to a portion of a bitstream. A substream may be associated with an attribute and refer to an attribute sub-bitstream.

An attribute (for example, indicated in a parameter set) may characterize volumetric content. An attribute may comprise, for example, a scalar or vector property that may be associated with a (for example, each) point in a volumetric frame, such as a color, transparency, reflectance, texture, surface normal, time stamps, material ID, etc.

Attribute information may include information about an attribute, such as a number of attributes, attribute index, attribute type, attribute ID, codec ID, attribute persistence, number of attribute dimensions or channels, attribute partitions, etc.

A parameter set may include attribute information for attributes that characterize volumetric content, A parameter set may include one or more parameters, such as a V-PCC component (for example, a V-PCC unit, such as occupancy, geometry, or attribute data units), codecs (for example, for occupancy, geometry, or attributes), geometry (for example, coordinates for a point in a point cloud), an attribute (for example, with a status, such as changed, active, inactive), attribute information, etc. A parameter set may be any type or format, such as a sequence parameter set (SPS), a component change parameter set (CCPS), a video-based point cloud compression parameter set (VPS), etc.

SEI messages may support adaptive streaming of volumetric content. For example, a component codec change (CCC) SEI message may inform a volumetric content decoder of codec changes to one or more visual volumetric content components. CCC SEI messages may reference a volumetric content sequence parameter set, Codec ID changes signaled in a CCC SEI message may be in relation to (for example, may pertain to) corresponding components that may be signaled in the referenced SPS unit. A volumetric content decoder may instantiate video coders (for example, new video decoders) for the respective components and codec IDs signaled in a received CCC SEI message, Table 4 shows an example of syntax for a CCC SEI message.

A message (for example, a CCC SEI message) may include a prefix SEI message and/or may be carried in a patch data group (PDG) unit of the PDG_PREFIX_SEI type. For example, a payloadType value for a CCC SEI message may be set to a value of 12. The persistence scope for a CCC SEI message may include the remainder of a bitstream. For example, codec changes for signaled components may persist until the end of a stream or until a different CCC SEI message is encountered.

Bitrate adaptation may include a decision to switch (for example, change or update) the representation of a volumetric content component to another representation. A volumetric content streaming client may make a decision to switch a representation of a visual volumetric content component to another representation. A representation available for a switch may be coded using a different codec. For example, a first representation may be encoded using AVC and a second representation may be encoded using HEVC. A volumetric content streaming client may (for example, based on a switch indication to another available representation) insert a VPCC_PDG unit that includes a CCC SEI message that comprises codec IDs for the codec(s) of the indicated, selected, or chosen representations. The VPCC_PDG unit may be inserted, for example, before the volumetric content bitstream that will be sent to the coding device (for example, the decoder). For example, a streaming client may decide to change or update the representation of a volumetric content component to a representation that was encoded using a different codec than the representation specified in the SFS (for example, V-PCC SPS). As described herein, changes or updates to the representation of a volumetric content component may be performed, for example, in response to limited network bandwidth during a streaming session. The representation of a volumetric content component may be changed or updated to a representation with lower bitrate, which may be coded using a different codec, for example, if the bandwidth available during a streaming session is low (for example, below a threshold).

TABLE 4 example of syntax for a CCC SEI message

| | Descriptor |
|---|---|
| component_codec_change( payloadSize ) { | |
|   sps_id | u(4) |
|   occupancy_codec_change_flag | u(1) |
|   geometry_codec_change_flag | u(1) |
|   attributes_codecs_change_flag | u(1) |
|   if ( occupancy_codec_change_flag ) { | |
|     occupancy_codec_id | u(8) |
|   } | |
|   if ( geometry_codec_change_flag ) { | |
|     geometry_codec_id | u(8) |
|   } | |
|   if ( sps_pcm_separate_video_present_flag) { | |
|     pcm_geometry_codec_change_flag | u(1) |
|     if ( pcm_geometry_codec_change_flag ) { | |
|       pcm_geometry_codec_id | u(8) |
|     } | |
|   } | |
|   if ( attributes_codecs_change_flag ) { | |
|     attribute_count_minus1 | u(7) |
|     for ( i = 0; i <= attribute_count_minus1; i++ ) { | |
|       attribute_idx[i] | u(7) |
|       attribute_codec_change_flag[i] | u(1) |
|       If ( attribute_codec_change_flag[i] ) { | |
|         attribute_codec_id[i] | u(8) |
|       } | |
|       if ( sps_pcm_separate_video_present_flag ) { | |
|         pcm_attribute_codec_change_flag[i] | u(1) |
|         if ( pcm_attribute_codec_change_flag[i] ) { | |
|           pcm_attribute _codec_id[i] | u(8) |
|         } | |
|       } | |
|     } | |
|   } | |
| } | |

The semantics of fields of CCC SEI message syntax (such as the example CCC SEI message syntax shown in Table 4) may include, for example, one or more of the following.

A variable, such as sps_id, may indicate the ID of a visual volumetric content sequence parameter set (for example, V-PCC sequence parameter set) that a CCC SEI message relates to.

A variable, such as occupancy_codec_change_flag, may indicate whether a codec for an occupancy component has changed. For example, an occupancy_codec_change_flag value of 1 may indicate that the codec has changed.

A variable, such as geometry_codec_change_flag, may indicate whether a codec for a geometry component has changed. For example, a geometry_codec_change_flag value of 1 may indicate that the codec has changed.

A variable, such as attributes_codecs_change_flag, may indicate whether a codec for one or more attribute components has changed. For example, an attributes_codecs_change_flag value of 1 may indicate that a codec for at least one of the attributes has changed while an attributes_codecs_change_flag value of 0 may indicate that no codec changes have occurred for any of the attributes.

A variable, such as occupancy_codec_id, may indicate the identifier of a new or updated codec for occupancy map information. For example, occupancy_codec_id may be set to a value within the range of 0 to 255, inclusive.

A variable, such as geometry_codec_id, may indicate the identifier of a new or updated codec for geometry information. For example, geometry_codec_id may be set to a value within the range of 0 to 255, inclusive.

A variable, such as pcm_geometry_codec_change_flag, may indicate whether a codec for geometry data for PCM coded points has changed. For example, a geometry_ codec_change_flag value of 1 may indicate that the codec has changed. PCM may stand for pulse code modulation. In some examples, PCM may stand for point cloud map.

A variable, such as pcm_geometry_codec_id, for example, if present, may indicate the identifier of a new codec for geometry data for PCM coded points (for example, if PCM coded points are encoded in a separate stream), For example; values of pcm_geometry_codec_id may be within the range of 0 to 255, inclusive.

A variable, such as attribute_count_minus1, plus 1 may indicate the number of attributes for which codec changes are signaled in the CCC SEI message.

A variable, such as attribute_idx[i], may indicate an attribute index in the volumetric content sequence parameter set (for example, V-PCC sequence parameter set) for the i-th attribute of the associated SEI message.

A variable, such as attribute_codec_change_flag[i], may indicate whether a codec for the i-th attribute in the SEI message has changed. For example, an attribute_codec_change_flag[i] value of 1 may indicate that the codec has changed.

A variable, such as attribute_codec_id[i], may indicate an identifier of a new codec for attribute video data with index i in an SEI message. For example, attribute_codec_id[i] may be within the range of 0 to 255, inclusive.

A variable, such as pcm_attribute_codec_change_flag[i], may indicate whether a codec for attribute video data for PCM coded points for attribute i in an SEI message has changed. For example, a pcm_attribute_codec_change_flagN value of 1 may indicate that the codec has changed.

A variable, such as pcm_attribute_codec_id[i] may, for example, if present, indicate an identifier of a new codec for attribute data for PCM coded points of attribute i in an SEI message (for example, if PCM coded points are encoded in a separate stream). For example, the value of pcm_attribute_codec_id[i] may be within the range of 0 to 255, inclusive.

An active attributes (AA) SEI Message may inform (for example, indicate to) a visual volumetric content decoder, for example, that one or more attributes signaled (for example, in a V-PCC of a codec) have changed for one or more of the visual volumetric content components. An AA SEI message may reference a specific visual volumetric content sequence parameter set. An AA SEI message may include attribute indices for attributes that are active, for example, if (for example, only) a sub-set of the attributes should be active. A sequence parameter set decoder may ignore (for example, deem inactive) other attributes in a referenced SPS (for example, attributes that are not listed in the M SEI message). Table 5 shows an example of syntax for an M SEI message.

An AA SEI message may be a prefix SEI message. An AA SEI message may be carried in the patch data group unit of type PDG_PREFIX_SEI. A payloadType value for an AA SEI message may be, for example, 13. A persistence scope for an AA SEI message may include, for example, the remainder of a bitstream. For example, the signaled active attributes may persist until the end of a stream or until a subsequent AA SEI message is received.

Bitrate adaptation may include (for example, may be implemented by) a volumetric content streaming client deciding to drop one or more of the attributes of volumetric content. A volumetric content streaming client may decide to drop one or more of the attributes of volumetric content, for example, due to limited network bandwidth. The volumetric content streaming may insert a VPCC_PDG unit containing an AA SEI message with a list of active attributes, for example, if a bitrate adaptation process in a V-PCC streaming client decides to drop one or more attributes of V-PCC content. The volumetric content streaming may insert a VPCC_PDG unit containing an M SEI message with a list of active attributes, for example, before volumetric content bitstream is sent to the decoder. A decoder (for example, that receives the VPCC_PDG unit) may skip the inactive attributes and/or may not expect volumetric content units in the bitstream associated with the inactive attributes.

A message may communicate information, for example, to assist with coding, reconstruction, display, and/or the like for a volumetric content. The information may include one or more of attributes, attribute information, an indication which attribute sub-bitstream indicated in a parameter set associated with the volumetric content is active or inactive, an indication which attribute associated with attribute information in the parameter set is active, an indication of message persistence (for example, until the end of a bitstream or until another message is received, an indication of the number of active attributes identified in the parameter set, an indication that the plurality of attributes in a parameter set are active, and/or an indication that an attribute is deactivated if a message does not refer to the attribute indicated in the parameter set. A message may be any type or format, such as an SEI message (for example, a component codec change (CCC) message, an active attributes (AA) message, a parameter set activation (PSA) message, etc.). A message may refer to, pertain to, or be associated with a parameter set (for example, V3C sequence parameter set). The message may be included in a bitstream.

TABLE 5 example of syntax for an AA SEI message

|  | Descriptor |
|---|---|
| active_attributes( payloadSize ) { |  |
|   sps_id | u(4) |
|   all_attributes_active_flag | u(1) |
|   if ( !all_attributes_active_flag_flag ) { |  |
|     attribute_count_minus1 | u(7) |
|     for ( i = 0; i <= attribute_count_minus1; i++ ) { |  |
|       attribute_idx[i] | u(7) |
|     } |  |
|   } |  |
| } |  |

The semantics of fields of M SEI message syntax (such as the example AA SEI message syntax shown in Table 5) may include, for example, one or more of the following.

An indication, such as sps_id, may indicate the ID of visual volumetric content (for example, V-PCC) sequence parameter set that an AA SEI message relates to.

An indication, such as all_attributes_active_flag, may indicate whether attributes signaled in a referenced SPS are active. For example, an all_attributes_active_flag value of 1 may indicate that all attributes are active. An all_attributes_active_flag value of 0 may indicate that a subset of the attributes are active.

A variable, such as attribute_count_minus1, plus 1 may indicate the number of active attributes signaled in an AA SEI message.

A variable, such as attribute_idx[i], may indicate an attribute index in a V-PCC SPS for an active attribute at index i in the associated AA SEI message.

The semantics of fields of AA SEI message syntax in Table 6 are meant to be examples only. A message (for example, the AA SEI message) may include less information. For example, the message may not include the indication sps_id. A message (for example, the AA SEI message) may include more information (for example, active layer or map information that is indicated in the parameter set).

A component change parameter set (CCPS) may include information about changes made to component sub-streams, for example, with respect to a volumetric sequence parameter set (for example, V-PCC SPS). A CCPS may include information about codec changes and/or active attributes. A CCPS may be carried, for example, in a (for example, certain type of) V-PCC unit. Table 6 shows an example, of syntax for a CCPS.

TABLE 6 example of syntax for a CCPS

| | Descriptor |
|---|---|
| component_change_parameter_set( ) { | |
|   ccps_component_change_parameter_set_id | u(8) |
|   ccps_sps_id | u(4) |
|     ccps_component_codec_change_flag | u(1) |
|     if ( ccps_component_codec_change_flag ) { | |
|       codec_change_information( ) | |
|     } | |
|   ccps_active_attributes_change_flag | u(1) |
|   if ( ccps_active_attributes_change_flag ) { | |
|       active_attributes_information( ) | |
|   } | |
|     byte_alignment( ) | |
| } | |
| codec_change_information( ) { | |
|   ccps_occupancy_codec_change_flag | u(1) |
|   ccps_geometry_codec_change_flag | u(1) |
|   ccps_attributes_codecs_change_flag | u(1) |
|   if ( ccps_occupancy_codec_change_flag ) { | |
|     ccps_occupancy_codec_id | u(8) |
|   } | |
|   if ( ccps_geometry_codec_change_flag ) { | |
|     ccps_geometry_codec_id | u(8) |
|   } | |
|   if ( sps_pcm_separate_video_present_flag) { | |
|     ccps_pcm_geometry_codec_change_flag | u(1) |
|     if ( ccps_pcm_geometry_codec_change_flag ) { | |
|       ccps_pcm_geometry_codec_id | u(8) |
|     } | |
|   } | |
|   if ( ccps_attributes_codecs_change_flag ) { | |
|     ccps_codec_change_attribute_count_minus1 | u(7) |
|     for ( i = 0; i <= ccps_codec_change_attribute_count_minus1; i++ ) { | |
|       ccps_codec_change_attribute_idx[i] | u(7) |
|       ccps_attribute_codec_change_flag[i] | u(1) |
|       if ( ccps_attribute_codec_change_flag[i] ) { | |
|         ccps_attribute_codec_id[i] | u(8) |
|       } | |
|       if ( sps_pcm_separate_video_present_flag ) { | |
|         ccps_pcm_attribute_codec_change_flag[i] | u(1) |
|         if ( ccps_pcm_attribute_codec_change_flag[i] ) { | |
|           ccps_pcm_attribute_codec_id[i] | u(8) |
|         } | |
|       } | |
|     } | |
|   } | |
| } | |
| active_attributes_information( ) { | |
|   ccps_all_attributes_active_flag | u(1) |
|   if ( !ccps_all_attributes_active_flag_flag ) { | |
|     ccps_active_attribute_count_minus1 | u(7) |
|     for ( i = 0; i <= ccps_active_attribute_count_minus1; i++ ) { | |
|       ccps_active_attribute_idx[i] | u(7) |
|     } | |
|   } | |
| } | |

The semantics of fields of CCPS syntax (such as the example of CCPS message syntax shown in Table 6) may include, for example, one or more of the following.

A variable, such as ccps_component_change_parameter_set_id, may provide an identifier for a CCPS for reference by other syntax elements. For example, the value of ccps_component_change_parameter_set_id may be in the range of 0 to 255, inclusive.

A variable, such as ccps_sps_id, may indicate an ID of a volumetric content (for example, PCC) sequence parameter set that a CCPS relates to.

A variable, such as ccps_component_codec_change_flag, may indicate whether a codec change has occurred for one or more of volumetric content (for example, V-PCC) components. For example, a ccps_component_codec_change_flag value of 1 may indicate a codec change has occurred.

A variable, such as ccps_active_attributes_change_flag, may indicate whether a set of active attributes has changed. For example, a ccps_active_attributes_change_flag value of 1 may indicate a change in the set of active attributes has occurred.

A variable, such as ccps_occupancy_codec_change_flag, may indicate whether a codec for an occupancy component has changed. For example, a ccps_occupancy_codec_change_flag value of 1 may indicate that the codec has changed.

A variable, such as ccps_geometry_codec_change_flag, may indicate whether a codec for a geometry component has changed. For example, a ccps_geometry_codec_change_flag value of 1 may indicate that the codec has changed.

A variable, such as ccps_attributes_codecs_change_flag, may indicate whether a codec for one or more attribute components has changed. For example, a ccps_attributes_codecs_change_flag value of 1 may indicate that the codec of at least one of the attributes has changed. A ccps_attributes_codecs_change_flag value of 0 may indicate that no codec changes have occurred for any of the attributes.

A variable, such as ccps_occupancy_codec_id, may indicate an identifier of a new codec for occupancy map information. For example; the value of occupancy_codec_id; may be within the range of 0 to 255, inclusive.

A variable, such as ccps_geometry_codec_id; may indicate an identifier of a new codec for geometry information. For example, the value of geometry_codec_id may be within the range of 0 to 255, inclusive.

A variable, such as ccps_pcm_geometry_codec_change_flag, may indicate whether a codec for geometry video data for PCM coded points changed. For example, a ccps_pcm_geometry_codec_change_flag value of 1 may indicate that the codec has changed.

A variable, such as ccps_pcm_geometry_codec_id, for example, if present, may indicate an identifier for a new codec for geometry video data for PCM coded points, for example; if PCM coded points are encoded in a separate video stream. For example, the values of pcm_geometry_codec_id, may be within the range of 0 to 255, inclusive.

A variable, such as ccps_codec_change_attribute_count_minus1, plus 1 may indicate the number of attributes for which codec changes are signaled in a CCPS.

A variable, such as ccps_codec_change_attribute_idx[i], may indicate an attribute index in a V-PCC SPS for an attribute at index i in the codec_change_information( )struct of the CCPS.

A variable, such as ccps_attribute_codec_change_flag[i], may indicate whether a codec for an i-th attribute in a codec_change_information( )struct of a CCPS has changed. For example; a ccps_attribute_codec_change_flag[i] value of 1 may indicate that a codec for the i-th attribute has changed.

A variable, such as ccps_attribute_codec_id[i], may indicate an identifier of a new codec for an attribute data with index i in a codec_change_information( ), struct of a CCPS. For example, the values of attribute_codec_id[i] may be within the range of 0 to 255, inclusive.

A variable, such as ccps_pcm_attribute_codec_change_flag[i], may indicate whether a codec for attribute video data for PCM coded points for attribute i in the codec_change_information( )struct of a CCPS has changed. For example, a ccps_pcm_attribute_codec_change_flag[i] value of 1 may indicate that a codec has changed.

A variable, such as ccps_pcm_attribute_codec_id[i]; for example; if present; may indicate an identifier of a new codec for attribute data for PCM coded points of attribute i in a codec_change_information( ) struct of a CCPS, for example, if PCM coded points are encoded in a separate stream. For example, the values of pcm_attribute_codec_id [i] may be within the range of 0 to 255, inclusive.

A variable, such as ccps_all_attributes_active_flag, may indicate whether attributes signaled in a referenced SPS are active. For example, a ccps_all_attributes_active_flag value of 1 may indicate that all attributes are active. A ccps_all_attributes_active_flag value of 0 may indicate that a subset of the attributes are active.

A variable, such as ccps_active_attribute_count_minus1, plus 1 may indicate the number of active attributes signaled in the CCPS.

A variable, such as ccps_active_attribute_idx[i], may indicate an attribute index in a volumetric content (for example, V-PCC) SPS for an active attribute at index i in an active_attribute_information( ), struct of a CCPS.

A parameter set activation (PSA) SEI Message may indicate which parameter sets are active for volumetric content (for example, V-PCC) units that may follow the PSA SEI message. Table 7 shows an example of syntax for a PSA SE message.

TABLE 7 example of syntax for a PSA SEI message

| | Descriptor |
|---|---|
| parameter_set_activation ( payloadSize ) { | |
|   active_sequence_parameter_set_id | u(4) |
|   component_change_flag | u(1) |
|   if ( component_change_flag ) { | |
|     active_component_change_parameter_set_id | u(8) |
|   } | |
| } | |

The semantics of fields of PSA SEI message syntax (such as the example PSA SEI message syntax shown in Table 7) may include, for example, one or more of the following.

A variable, such as active_sequence_parameter_set_id, may indicate and/or may be equal to the value of the sps_sequence_parameter_set_id of the active volumetric content SPS (for example, the V-PCC SPS that should be activated). For example, the value of active_sequence_parameter_set_id may be within the range of 0 to 15, inclusive.

A variable, such as component_change_flag, may indicate whether a component change parameter set is to be activated. For example, a component_change_flag value of 1 may indicate that a component change parameter set should be activated.

A variable, such as active_component_change_parameter_set_id, may indicate and/or may be equal to the value of the ccps_component_change_parameter_set_id of the CCPS that is to be activated. The value of active_component_change_parameter_set_id may be within the range of 0 to 255, inclusive.

A PSA SEI message (for example, as shown in Table 7, which may be generated by example encoder 200 and received by example decoder 300) may indicate which parameter sets associated with volumetric content (for example, V-PCC) are active for V-PCC components. A CCC SEI message (for example, generated by example encoder 200 and received by example decoder 300) may indicate which codec should be used to decode volumetric content components (for example, V-PCC units shown in FIG. 5, Tables 1, 2 and 3) in volumetric content (for example, a V-PCC bitstream shown in FIG. 5).

FIG. 7 illustrates an example of a method for processing visual volumetric content based on one or more messages. The method as described in FIG. 7 may be performed by an example encoder or an example client device. Examples disclosed herein and other examples may operate in accordance with example method 700 shown in FIG. 7. Method 700 comprises 702 and 704. In 702, a determination may be made to deactivate an attribute sub-bitstream of one or more attribute sub-bitstreams indicated in a parameter set associated with visual volumetric content. In 704, a message indicating the deactivation of the attribute sub-bitstream may be generated and sent. Example method 700 may be implemented, for example, by an encoder, such as example encoder 200. Example method 700 may be implemented, for example, by a streaming client, such as a visual volumetric content streaming client. Example method 700 may be implemented, for example, in accordance with example syntax and semantics described herein for visual volumetric bitstream. SEI messages and/or parameter sets, including, for example, a CCC message, an AA message, a CCPS, and/or a PSA message.

FIG. 8 illustrates an example of a method for processing visual volumetric content based on one or more messages. The method as described in FIG. 8 may be applied in the decoder. Examples disclosed herein and other examples may operate in accordance with example method 800 shown in FIG. 8. Method 800 comprises 802 and 804. In 802, a determination may be made about which attribute sub-bitstream to use for decoding visual volumetric content based on a message that indicates which attribute sub-bitstream of one or more attribute sub-bitstreams indicated in a parameter set associated with the visual volumetric is active. In 804, the visual volumetric content may be decoded using an active attribute sub-bitstream (for example, the active attribute sub-bitstream determined in 802) based on the message. Example method 800 may be implemented, for example, by a decoder, such as example decoder 300. Example method 800 may be implemented, for example, by a media content decoder, such as a visual volumetric content decoder. Example method 800 may be implemented, for example, in accordance with example syntax and semantics described herein for visual volumetric bitstream SEI messages and/or parameter sets, including, for example, a CCC message, an PA message, a CCPS, and/or a PSA message.

Many embodiments are described herein. Features of embodiments may be provided alone or in any combination, across various claim categories and types. Further, embodiments may include one or more of the features, devices, or aspects described herein, alone or in any combination, across various claim categories and types, such as, for example, any of the following.

A decoder may decode media content based on one or more messages, which may indicate which attribute sub-bitstream of one or more attribute sub-bitstreams indicated in a parameter set is active. The media content may comprise, for example, visual volumetric content. The parameter set may be associated with the visual volumetric content. For example, the parameter set may comprise a visual volumetric video-based parameter set. A decoder may perform decoding, such as determining which attribute sub-bitstream to use for decoding the visual volumetric content, based on the one or more messages, A media content decoder, such as example decoder 300 operating in accordance with the example method shown in FIG. 8, may determine which attribute sub-bitstream to use for decoding the visual volumetric content based on a message that indicates which attribute sub-bitstream among one or more attribute sub-bitstreams indicated in a parameter set associated with the media content is active. A media content decoder, such as example decoder 300 operating in accordance with the example method shown in FIG. 8, may decode the visual volumetric content using an active attribute sub-bitstream based on the message.

The attribute sub-bitstreams indicated in the parameter set(s) may indicate information about the visual volumetric content. An attribute sub-bitstream may comprise a sub-bitstream associated with an attribute that characterizes a visual volumetric content. The attribute sub-bitstream may comprise attributes characterizing the media content, such as a color, transparency, reflectance, texture, etc.

The message may comprise, for example, a visual volumetric SEI message, such as an AA SEI message (for example as shown in Table 5), which may reference a visual volumetric SPS and may indicate an attribute index(es) for the active attribute(s). The message indicating a list of active attribute sub-bitstreams may be received by the decoder. The message may be generated and sent to a decoder, for example, to indicate the deactivation of the one or more attribute sub-bitstreams. The decoder may determine arm inactive attribute sub-bitstream based on the message. The decoder may decode the visual volumetric content using an attribute sub-bitstream indicated to be active in a message (for example, an AA SEI message). The decoder may skip an attribute sub-bitstream indicated to be inactive in the message for decoding the visual volumetric content.

Decoding tools and techniques including one or more of entropy decoding, inverse quantization, inverse transformation, and differential decoding may be used to enable the method as described in FIG. 8 in the decoder. These decoding tools and techniques may be used to enable one or more of receiving media content, such as visual volumetric content, according to the method described in FIG. 8 or otherwise described herein, decoding media content according to the method as described in FIG. 8 or otherwise described herein; determining which attribute sub-bitstream to use to decode media content, such as visual volumetric content, according to the method as described in FIG. 8 or otherwise described herein; receiving and parsing messages, for example, an SEI message, such as AA SEI messages, CCC SEI messages and PSA SEI messages, according to the method as described in PG. 8 or otherwise described herein; receiving and parsing parameter sets; such as SPS and CCPS, which may indicate map information associated with attribute sub-bitstreams, the active map information being indicated by the indicated active attribute sub-bitstream(s), according to the method as described in FIG. 8 or otherwise described herein; decoding visual volumetric content using an active attribute sub-bitstream or active map information associated with the active attribute sub-bitstream determined based on a message and/or a parameter set, according to the method as described in FIG. 8 or otherwise described herein; determining a persistence of a message, such as until the end of a bitstream or until another message arrives, according to the method as described in FIG. 8 or otherwise described herein; determining the number of active attribute sub-bitstreams in one or more attribute sub-bitstreams indicated in a parameter set, such as a parameter set comprising VPS with attribute information referred to by a message to indicate an active attribute sub-bitstream, associated with visual volumetric content, according to the method as described in FIG. 8 or otherwise described herein; determining based on an indicator in a message that one or more attribute sub-bitstreams in a parameter set associated with visual volumetric content are active, according to the method as described in FIG. 8 or otherwise described herein; determining that an attribute sub-bitstream is inactive (for example, based on the attribute sub-bitstream being indicated in a parameter set but not in the message or, for example, based on the message not referring to the attribute sub-bitstream or an indicator of the attribute sub-bitstream or, for example, based on bitrate adaptation) and skipping the inactive attribute sub-bitstream for the decoding of visual volumetric content, according to the method as described in FIG. 8 or otherwise described herein; and other decoder behaviors that are related to any of the above.

An encoder (for example, an encoder as described herein) may encode media content, for example, to generate visual volumetric content that may be transmitted as a bitstream in streaming services. An encoder or a client device (for example, an application) may generate and send one or more messages, which may indicate which attribute sub-bitstream of one or more attribute sub-bitstreams indicated in a parameter set is active. The parameter set may be associated with visual volumetric content. For example, the parameter set may comprise a visual volumetric video-based parameter set (VPS).

An encoder or a client device (for example, an application) may determine which attribute sub-bitstream of one or more attribute sub-bitstreams indicated in a parameter set is active or inactive, for example, based on an evaluation of the relevance of the attribute sub-bitstream, an operating environment, resource availability, bandwidth attribute, client coding capabilities, and/or client rendering capabilities. In an example, an encoder or a client device may determine which attribute sub-bitstream of one or more attribute sub-bitstreams indicated in a parameter set is to be deactivated based on bitrate adaptation in a streaming session. The encoder or client device may indicate the deactivation of one or more attributes based on the determination on which attribute sub-bitstream of one or more attribute sub-bitstreams indicated in a parameter set is to be deactivated. A media content processor (for example, an encoder, such as example encoder 200), operating in accordance with the example method shown in FIG. 7, may determine to deactivate an attribute sub-bitstream of one or more attribute sub-bitstreams indicated in a parameter set associated with visual volumetric content. The media content processor may include the streaming client device as described herein.

The media content processor (for example, an encoder, such as example encoder 200), operating in accordance with the example method shown in FIG. 7, may generate and send a message indicating a deactivation of one or more attribute sub-bitstreams, for example, to a decoder. The message may comprise, for example, a visual volumetric SEI message, such as an AA SEI message (for example as shown in Table 5), which may reference a VPS and may indicate an attribute index(es) for the active attribute(s). The message with one or more inactive and/or active attribute sub-bitstreams may be sent by the encoder to the decoder.

Encoding tools and techniques including one or more of quantization, entropy coding, inverse quantization, inverse transformation, and differential coding may be used to enable the method as described in FIG. 7 in the encoder. These encoding tools and techniques may be used to enable one or more of generating or sending media content, such as visual volumetric content, according to the method described in FIG. 7 or otherwise described herein, encoding media content according to the method as described in FIG. 7 or otherwise described herein; determining which attribute sub-bitstream to use to encode media content, such as visual volumetric content, according to the method as described in FIG. 7 or otherwise described herein; generating and sending messages, for example, an SEI message, such as AA SEI messages, CCC SEI messages and PSA SEI messages, according to the method as described in FIG. 7 or otherwise described herein; generating and sending parameter sets, such as SPS and CCPS, which may indicate map information associated with attribute sub-bitstreams, the active map information being indicated by the indicated active attribute sub-bitstream(s), according to the method as described in FIG. 7 or otherwise described herein; encoding visual volumetric content using an active attribute sub-bitstream or active map information associated with the active attribute, according to the method as described in FIG. 7 or otherwise described herein; indicating a persistence of a message, such as until the end of a bitstream or until another message arrives, according to the method as described in FIG. 7 or otherwise described herein; indicating the number of active attribute sub-bitstreams in one or more attribute sub-bitstreams indicated in a parameter set (such as a parameter set comprising VPS with attribute information referred to by a message to indicate an active attribute sub-bitstream) associated with visual volumetric content, according to the method as described in FIG. 7 or otherwise described herein; indicating in a message that one or more attribute sub-bitstreams in a parameter set associated with visual volumetric content are active, according to the method as described in FIG. 7 or otherwise described herein; indicating that an attribute sub-bitstream is inactive (for example, based on the attribute sub-bitstream being indicated in a parameter set but not in the message or, for example, based on the message not referring to the attribute sub-bitstream or an indicator of the attribute sub-bitstream or, for example, based on bitrate adaptation) and dropping or skipping the inactive attribute sub-bitstream for the encoding of visual volumetric content, according to the method as described in FIG. 7 or otherwise described herein; and other encoder behaviors that are related to any of the above.

A syntax element(s), such as syntax elements shown in Tables 1-7, may be inserted in the signaling, for example, to enable the decoder to identify an indication of active attribute sub-bitstreams and/or codecs to perform the decoding method as described in FIG. 8. For example, the syntax element may include an indication of one or more of an attribute sub-bitstream, an attribute sub-bitstream ID, a parameter set, an attribute sub-bitstream change indication, an attribute codec change indication, an attribute codec ID, an attribute active indication, an attribute sub-bitstream inactive indication, an active attribute count indication, an active parameter set indication, an active parameter set ID, an active parameter set change indication, for example, to indicate to the decoder whether one or more of them are active or inactive for use in decoding. As an example, the syntax element may include an indication of one or more of an attribute index, an attribute state, such as active, inactive or change flag, and/or an attribute count as described herein, and/or an indication of a parameter that the decoder uses to perform one or more examples herein.

The method as described in FIG. 8 may be selected and/or applied, for example, based on the syntax element(s) to apply at the decoder. For example, the decoder may receive an indication (for example, in a message or a parameter set) that indicates a change in the active/inactive status of an attribute sub-bitstream and/or a codec to be used to decode visual volumetric content. Based on the indication, the decoder may select an attribute sub-bitstream and/or a codec as described in FIG. 8 for use in decoding a visual volumetric component.

A bitstream or signal may include one or more of the described syntax elements, or variations thereof. For example, a bitstream or signal may include a syntax element(s) that indicates an indication of active attribute sub-bitstreams and/or codecs to perform the decoding method as described in FIG. 8.

A bitstream or signal may include syntax conveying information generated according to one or more examples herein. For example, information or data may be generated in performing the examples as shown in FIGS. 7 and 8, including any examples described herein within the scope of examples shown in FIGS. 7 and 8. The generated information or data may be conveyed in syntax included in the bitstream or signal.

Syntax elements that enable the decoder to use active attribute sub-bitstream(s) and codec(s) to decode a visual volumetric component in a manner corresponding to that used by an encoder may be inserted in a signal. For example, one or more messages and/or parameter sets indicating attribute sub-bitstream(s) and codec(s) to use for decoding may be generated using one or more examples herein.

A method, process, apparatus, medium storing instructions, medium storing data, or signal for creating and/or transmitting and/or receiving and/or decoding a bitstream or signal that includes one or more of the described syntax elements, or variations thereof.

A method, process, apparatus, medium storing instructions, medium storing data, or signal for creating and/or transmitting and/or receiving and/or decoding according to any of the examples described.

A method, process, apparatus, medium storing instructions, medium storing data, or signal according to, but not limited to one or more of the following in any number or combination: process, decode or decode media content; perform dynamic adaptation of point cloud component sub-bitstreams in point cloud streaming services; obtain an indication that indicates whether at least one attribute signaled in a referenced parameter set is inactive; determine to deactivate an attribute sub-bitstream of one or more attribute sub-bitstreams indicated in a parameter set associated with visual volumetric content; generate and send a message indicating the deactivation of the attribute sub-bitstream; obtain an active attribute indication (for example, the number of active attributes and their respective attribute indices), for example, if the indication indicates at least one attribute in the referenced parameter set is inactive; identify inactive attributes, for example, based on the active attribute indication; skip the inactive attributes in the referenced parameter set during decoding; obtain a parameter set associated with visual volumetric content; receive a message that indicates which attribute sub-bitstream of one or more attribute sub-bitstreams indicated in the parameter set is active; determine an active attribute sub-bitstream and an inactive attribute sub-bitstream based on the message; determine which attribute sub-bitstream to use for decoding visual volumetric content based on a message that indicates which attribute sub-bitstream of one or more attribute sub-bitstreams indicated in a parameter set associated with visual volumetric content is active; decode the visual volumetric content using an active attribute sub-bitstream based on the message; decode the visual volumetric content using the active attribute sub-bitstream and skip the inactive attribute sub-bitstream; signaling or receiving a message; such as an SEI message, in a bitstream; signaling or receiving a message with a persistence scope that persists until an end of a bitstream or until another message that is different from the message is received; signaling or receiving a message with an indicator that indicates a number of active attribute sub-bitstreams of the plurality of attribute sub-bitstreams indicated in the parameter set associated with visual volumetric content; signaling or receiving a parameter set comprising a VPS comprising attribute information; signaling or receiving a message that refers to a piece of the attribute information in a VPS for the active attribute sub-bitstream; signaling or receiving a message comprising an indicator that the plurality of attribute sub-bitstreams indicated in the parameter set are active; signaling or receiving a parameter set indicating map information associated with a respective attribute sub-bitstream of the plurality of attributes; signaling or receiving a message indicating which map information is active, for example; by indicating which attribute sub-bitstream of the plurality of attribute sub-bitstreams indicated in the parameter set is active; decoding visual volumetric content using active map information associated with the active attribute sub-bitstream; signaling and/or receiving one or more attribute sub-bitstreams that indicate, for example, texture information, material information, transparency information, and/or reflectance information associated with or characterizing the visual volumetric content; determining an inactive attribute sub-bitstream based on a message; determining as an inactive sub-bitstream an attribute sub-bitstream that is indicated in the parameter set but not indicated in the message; skipping an inactive attribute sub-bitstream for the decoding of the visual volumetric content; indicating or receiving an indication of the deactivation of an attribute sub-bitstream in a message; determining that an attribute sub-bitstream is deactivated if the attribute sub-bitstream or an indicator of the attribute sub-bitstream is not referred to in a message; and/or determining that an attribute sub-bitstream is deactivated based on bitrate adaptation.

A TV, set-top box; cell phone, tablet, or other electronic device that performs dynamic adaptation of visual volumetric content, such as visual volumetric component sub-bitstreams in visual volumetric streaming services, according to any of the examples described herein.

A TV, set-top box; cell phone, tablet, or other electronic device that performs dynamic adaptation of visual volumetric content, such as visual volumetric component sub-bitstreams in visual volumetric streaming services, according to any of the examples described herein, and that displays (for example; using a monitor, screen; or other type of display) a resulting visual representation.

A TV, set-top box; cell phone; tablet, or other electronic device that selects (for example, using a tuner) a channel to receive a signal including an encoded volumetric frame, and performs dynamic adaptation of visual volumetric content, such as visual volumetric component sub-bitstreams in visual volumetric streaming services, according to any of the examples described herein.

A TV, set-top box, cell phone, tablet, or other electronic device that receives (for example, using an antenna) a signal over the air that includes an encoded volumetric frame, and performs dynamic adaptation of visual volumetric content, such as visual volumetric component sub-bitstreams in visual volumetric streaming services, according to any of the examples described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus for decoding media content, comprising one or more processors, wherein the one or more processors are configured to:
   obtain a parameter set associated with visual volumetric content;
   receive a supplemental enhancement information (SEI) message that indicates which attribute sub-bitstream of a plurality of attribute sub-bitstreams indicated in the parameter set is active;
   determine an active attribute sub-bitstream and an inactive attribute sub-bitstream based on the SEI message; and
   decode the visual volumetric content using the active attribute sub-bitstream and skip the inactive attribute sub-bitstream.

2. A method for decoding media content, comprising:
   obtaining a parameter set associated with visual volumetric content;
   receiving a supplemental enhancement information (SEI) message that indicates which attribute sub-bitstream of a plurality of attribute sub-bitstreams indicated in the parameter set is active;
   determining an active attribute sub-bitstream and an inactive attribute sub-bitstream based on the SEI message; and
   decoding the visual volumetric content using the active attribute sub-bitstream and skipping the inactive attribute sub-bitstream.

3. The apparatus of claim 1, wherein the SEI message is signaled in a bitstream.

4. The apparatus of claim 1, wherein the SEI message has a persistence scope that persists until an end of a bitstream.

5. The apparatus of claim 1, wherein the SEI message has a persistence scope that persists until another SEI message that is different from the SEI message is received.

6. The apparatus of claim 1, wherein the SEI message comprises an indicator that indicates a number of active attribute sub-bitstreams of the plurality of attribute sub-bitstreams indicated in the parameter set associated with the visual volumetric content.

7. The apparatus of claim 1, wherein the parameter set comprises a visual volumetric video-based parameter set (VPS) that comprises attribute information for the plurality of attribute sub-bitstreams, wherein the SEI message refers to attribute information for a subset of the plurality of attribute sub-bitstreams.

8. The apparatus of claim 1, wherein the plurality of attribute sub-bitstreams indicate texture information, material information, transparency information, or reflectance information associated with the visual volumetric content.

9. The apparatus of claim 1, wherein the parameter set indicates map information associated with a respective attribute sub-bitstream of the plurality of attribute sub-bitstreams, and the SEI message indicates which map information of the map information associated with the respective attribute sub-bitstream of the plurality of attribute sub-bitstreams is active, wherein the visual volumetric content is decoded using active map information.

10. The apparatus of claim 1, wherein the SEI message comprises an indicator that the plurality of attribute sub-bitstreams indicated in the parameter set associated with the visual volumetric content are active.

11. The apparatus of claim 3, wherein the inactive attribute sub-bitstream is determined based on the SEI message, wherein the inactive attribute sub-bitstream is skipped for the decoding of the visual volumetric content.

12. The apparatus of claim 1, wherein an attribute sub-bitstream that is indicated in the parameter set but not indicated in the SEI message is determined to be the inactive attribute sub-bitstream, wherein the inactive attribute sub-bitstream is skipped for the decoding of the visual volumetric content.

13. The apparatus of claim 1, wherein the SEI message indicates the inactive attribute sub-bitstream by not referring to an indicator associated with the inactive attribute sub-bitstream.

14. The method of claim 2, wherein the SEI message is signaled in a bitstream.

15. The method of claim 2, wherein the SEI message has a persistence scope that persists until an end of a bitstream.

16. The method of claim 2, wherein the SEI message has a persistence scope that persists until another SEI message that is different from the SEI message is received.

17. The method of claim 2, wherein the SEI message comprises an indicator that indicates a number of active attribute sub-bitstreams of the plurality of attribute sub-bitstreams indicated in the parameter set associated with the visual volumetric content.

18. The method of claim 2, wherein the parameter set comprises a visual volumetric video-based parameter set (VPS) that comprises attribute information for the plurality of attribute sub-bitstreams, wherein the SEI message refers to attribute information for a subset of the plurality of attribute sub-bitstreams.

19. A non-transitory computer readable medium containing data content generated according to the method of claim 2.

20. A computer readable medium including instructions for causing one or more processors to perform the method of claim 2.

* * * * *